(12) United States Patent
Ishikura

(10) Patent No.: US 6,453,132 B2
(45) Date of Patent: Sep. 17, 2002

(54) INPUT DISPLAY SYSTEM

(75) Inventor: Kaoru Ishikura, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/813,613

(22) Filed: Mar. 21, 2001

(30) Foreign Application Priority Data

Mar. 31, 2000  (JP) ..................................... 2000-099692

(51) Int. Cl.$^7$ ........................... G03G 21/00; G09G 5/00
(52) U.S. Cl. ........................................ 399/81; 345/961
(58) Field of Search .................... 399/81, 82; 361/681; 345/961, 966, 967

(56) References Cited

U.S. PATENT DOCUMENTS 5,701,548 A  * 12/1997  Okatani ........................ 399/8
5,950,045 A  *  9/1999  Nomura et al. ............... 399/81
6,285,842 B1 *  9/2001  Katamoto et al. ............. 399/81

FOREIGN PATENT DOCUMENTS

JP  1-261667  10/1989
JP  5-100646  4/1993
JP  2000-307781  * 11/2000

OTHER PUBLICATIONS

U.S. patent application Ser. No. 09/718,784, Nomura et al., filed Nov. 22, 2000.*

* cited by examiner

*Primary Examiner*—Sophia S. Chen
(74) *Attorney, Agent, or Firm*—Dike, Bronstein, Roberts & Cushman IP Group Edwards & Angell, LLP; David G. Conlin; David A. Tucker

(57) ABSTRACT

Icons (displayed in the pictorial outline display area and in the finished output style display area) for displaying the conditions in accordance with the input of conditions through setting keys(keys displayed in setting key display area) integrally display multiple number of conditions input through setting keys in a multiple number of setting frames. A condition pictorially represented corresponding to the setting key arranged in the input-active setting frame is made visually distinguishable from that pictorially represented corresponding to the setting key arranged in an input-inactive setting frame.

13 Claims, 14 Drawing Sheets

INPUT DISPLAY SYSTEM

BACKGROUND OF THE INVENTION

1. Field of the Invention

The present invention relates to an input display system through which the operating conditions are set up for a copier, facsimile machine, printer or any other appliance.

2. Description of the Prior Art

Since recent appliances such as copiers, facsimile machines, printers have become able to perform printing in various modes, a variety of operating conditions such as the number of prints, print density, print size, print magnification and the like must be set when printing is performed. To deal with this situation, some techniques have been developed whereby setting keys for setting various operating conditions are displayed on a liquid crystal device or the like so as to allow the user to operate these setting keys in order to set the operating conditions.

For example, Japanese Patent Application Laid-Open Hei 1 No.261667 discloses a copier having a touch-operating interactive user interface with which setting frames can be switched from one to another to set up conditions. In this copier, setting keys in the setting frame are represented by icons so that the user is able to intuitively recognize the meaning of the condition setting keys, thus providing easy selection of the setting keys.

Japanese Patent Application Laid-Open Hei 5 No.100646 discloses an image display system in which a single integrated icon is displayed to represent multiple conditions. In this system, the result of combination of the functions designated by the user are successively displayed as images so as to allow for easy recognition of setup conditions and prevent setup errors.

However, the above prior art technologies have problems as follows.

According to the technology disclosed in Japanese Patent Application Laid-Open Hei 1 No.261667, it is possible to set up different conditions by switching the setting frame, but only the setting keys alone are represented by icons. Since the set conditions cannot be represented by an integrated icon, this configuration suffers the problem of users taking time over checking and recognition of their set conditions.

According to the technology disclosed in Japanese Patent Application Laid-Open Hei 5 No.100646, it is disclosed that a multiple number of conditions are represented by one integrated icon, but there is no reference to how the integrated icon is related to the setting frame for setting up conditions.

Accordingly, even if the above prior art technologies are combined, the combination only leads to a configuration whereby multiple conditions within the setting frame are integrally represented. That is, it is impossible for this configuration to reduce the display frame in size and provide an easy-to-recognize setup indication that is able to prevent setup errors.

SUMMARY OF THE INVENTION

The present invention has been proposed in view of the above problems and it is therefore an object of the present invention to provide an input display system which uses a compact display screen and is capable of performing pictorial representations of input conditions in one single integrated icon and providing ease in checking the setup conditions by making clear the relationship between setting keys and pictorial representations in the icon and which is able to positively prevent setup errors.

In order to achieve the above object, the input display system of the present invention is configured as follows:

In accordance with the first aspect of the present invention, an input display system includes:

a plurality of setting frames, each having setting keys for setting the operational conditions of an apparatus;

a switching means for making one of the plural setting frames active to permit input and displaying the input-active setting frame;

an icon for representing the set conditions in accordance with the conditions set up through the setting keys; and a display means for displaying one of the plurality of setting frames with the icon, and is characterized in that the icon pictorially and integrally represents the multiple conditions set up via the setting keys, each belonging to any of the plural setting frames, and conditions pictorially represented corresponding to the setting keys arranged in input-active setting frames are made visually distinguishable from those pictorially represented corresponding to the setting keys arranged in input-inactive setting frames.

In accordance with the second aspect of the present invention, the input display system having the above first feature further includes a back key for canceling the condition set up immediately before by a setting key and activating the setting frame corresponding to the condition.

In accordance with the third aspect of the present invention, the input display system having the above first feature is characterized in that pictorial representations displayed in the integrally displayed icon are used as input triggers so that one of the plural setting frames will be made active.

In accordance with the fourth aspect of the present invention, the input display system having the above second feature is characterized in that pictorial representations displayed in the integrally displayed icon are used as input triggers so that one of the plural setting frames will be made active.

In accordance with the fifth aspect of the present invention, the input display system having the above first feature is characterized in that, of the conditions integrally and pictorially represented in the icon, the relationship between one setting key arranged in an input-active setting frame and the pictorial representation corresponding to the setting key is made visually distinguishable from that between one setting key arranged in an input-inactive setting frame and the pictorial representation corresponding to the setting key.

In accordance with the sixth aspect of the present invention, the input display system having the above second feature is characterized in that, of the conditions integrally and pictorially represented in the icon, the relationship between one setting key arranged in an input-active setting frame and the pictorial representation corresponding to the setting key is made visually distinguishable from that between one setting key arranged in an input-inactive setting frame and the pictorial representation corresponding to the setting key.

In accordance with the seventh aspect of the present invention, the input display system having the above third feature is characterized in that, of the conditions integrally and pictorially represented in the icon, the relationship between one setting key arranged in an input-active setting frame and the pictorial representation corresponding to the setting key is made visually distinguishable from that between one setting key arranged in an input-inactive setting frame and the pictorial representation corresponding to the setting key.

In accordance with the eighth aspect of the present invention, the input display system having the above fourth feature is characterized in that, of the conditions integrally and pictorially represented in the icon, the relationship between one setting key arranged in an input-active setting frame and the pictorial representation corresponding to the setting key is made visually distinguishable from that between one setting key arranged in an input-inactive setting frame and the pictorial representation corresponding to the setting key.

In accordance with the ninth aspect of the present invention, the input display system having the above fifth feature is characterized in that when a plurality of setup conditions exist in one input-active setting frame, the relationship between each setup function and the pictorial representation corresponding to the setup condition in the integrally displayed icon is displayed so as to be visually distinctive from other relationships.

In accordance with the tenth aspect of the present invention, the input display system having the above sixth feature is characterized in that when a plurality of setup conditions exist in one input-active setting frame, the relationship between each setup function and the pictorial representation corresponding to the setup condition in the integrally displayed icon is displayed so as to be visually distinctive from other relationships.

In accordance with the eleventh aspect of the present invention, the input display system having the above seventh feature is characterized in that when a plurality of setup conditions exist in one input-active setting frame, the relationship between each setup function and the pictorial representation corresponding to the setup condition in the integrally displayed icon is displayed so as to be visually distinctive from other relationships.

In accordance with the twelfth aspect of the present invention, the input display system having the above eighth feature is characterized in that when a plurality of setup conditions exist in one input-active setting frame, the relationship between each setup function and the pictorial representation corresponding to the setup condition in the integrally displayed icon is displayed so as to be visually distinctive from other relationships.

In accordance with the thirteenth aspect of the present invention, the input display system having any one of the above first through twelfth features is characterized in that if any condition set up in an input-active setting frame yields an unpreferred result, this fact is warned of by the integral pictorial representation and at the same time the conditions for producing a normal output result is informed by the pictorial representation and condition key.

DESCRIPTION OF THE PREFERRED EMBODIMENTS

One embodiment of an input display system according to the present invention will be described with reference to the accompanying drawings.

The input display system according to the present invention is a device for setting up various operations of an image forming apparatus. The description hereinbelow is made on an input display system for setting various operational conditions such as print amount, print contrast, print size, print magnification etc., for a digital copier as a typical example of image forming apparatus.

(Digital Copier)

Figure 1:
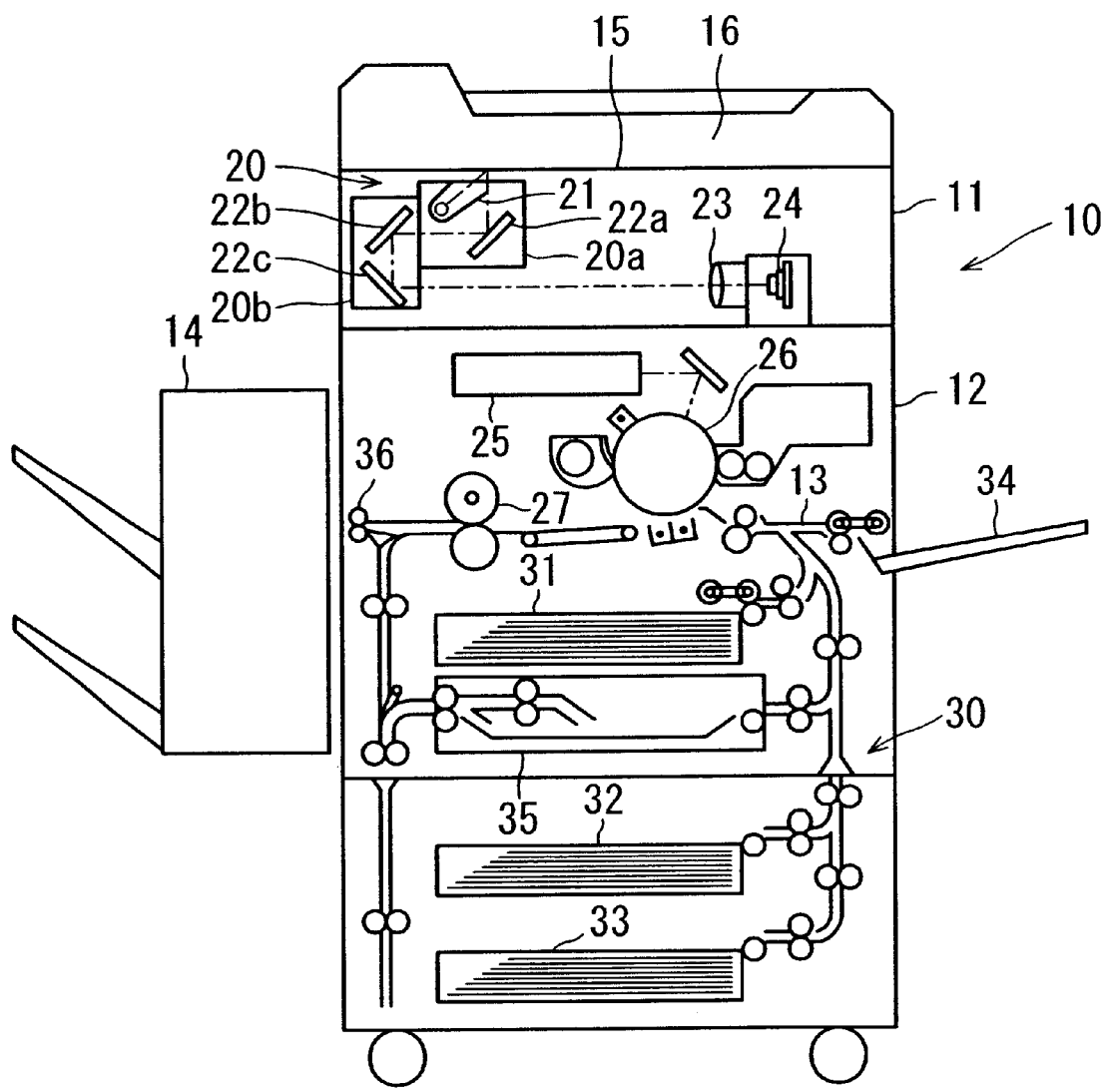
FIG. 1 is a sectional view showing the main part of a digital copier having an input display system according to the present invention.

The input display system according to the present invention is provided for, for example, a digital copier 10 shown in FIG. 1.

This digital copier 10 is mainly composed of a scanner portion 11 and a laser printer portion 12, as shown in FIG. 1.

Scanner portion 11 includes: an original table 15 of transparent glass; a reversing automatic document feeder(to be referred to hereinbelow as RADF) 16 for conveying and feeding originals automatically onto original table 15; and an original image reading unit (to be referred to hereinbelow as scanner unit) 20 for reading by scanning the image of the original placed on original table 15.

The original image scanned by this scanner portion 11 is sent as image data to an image data input portion, where the image data is subjected to predetermined image processes.

RADF 16 is a device which has a number of documents placed at a time on its document tray(not shown) so that the set documents are automatically fed one by one onto document table 15 of scanner unit 20. In order for scanner unit 20 to read one side or both sides of documents in accordance with the operator choice, this RADF 16 is comprised of a one-sided document feed path and a dual-sided document feed path and a feed path switch for switching the feed from one to the other, a group of sensors for detecting and managing the state of the document passing through the different positions and a controller. RADF 16 can be configured by applying many types disclosed in the prior art.

Scanner unit 20 as a part of scanner portion 11 includes: a lamp reflector assembly 21 for exposure of the document surface; a first scan unit 20a; a second scan unit 20b; a photoelectric transducer(to be referred to hereinbelow as CCD) 24 for converting the reflected light image from the original into electric image signals; and an optical lens 23 for focusing the light reflected from the original onto CCD 24.

First scan unit 20a is provided with a first reflection mirror 22a for directing the light image reflected from the original toward CCD 24. Second scan unit 20b is provided with a second reflection mirror 22b and a third reflection mirror 22c for directing the reflected light image from first reflected mirror 22a toward CCD 24.

As the originals to be read are successively placed onto original table 15 in association with the actions of RADF 16 and scanner unit 20, scanner portion 11 reads the original image by moving scanner unit 20 along the undersurface of original table 15.

More illustratively, first scan unit 20a travels at a constant speed V from the left to right along the original table 15 in FIG. 1 while second scan unit 20b is controlled so as to travel parallel to and in the same direction as the first scan unit at a speed of V/2. With this operation, the image of the original placed on original table 15 is focused on and successively read linewise by CCD 24.

The image data obtained by scanner unit 20 is sent to the image processor, where the data is subjected to various treatments. Then the processed image data is temporarily stored in the memory. As an output instruction is issued, the image data is loaded from the memory and transferred to laser recording portion 12, whereby an image is formed on a recording sheet.

Laser recording portion 12 includes a conveying system for conveying sheets as recording media on which images are formed, a laser writing unit 25 and an electrophotographic processing portion 26 for forming images.

Though not illustrated in detail, laser writing unit 25 includes: a semiconductor laser source; a polygon mirror; and an f-theta lens. In this laser writing unit 25, laser beams are emitted in accordance with the image data stored in the memory (or the image data captured by scanner unit 20) or in accordance with image data transmitted from external devices. This laser beam is deflected by the polygon mirror at an equiangular speed. Then the equiangularly deflected beam is corrected by the f-theta lens so that the laser spot focused on the photosensitive drum surface of electrophotographic processing portion 26 will move at an equiangular speed.

As is well known, electrophotographic processing portion 26 includes: a charger, developing unit, transfer unit, separating unit, cleaning unit, erasing unit, all being arranged around the photosensitive drum.

The sheet conveying system is comprised of a conveying portion 13 for conveying the sheet to the transfer station where the transfer unit of electrophotographic processing portion 26 is arranged, a paper feed portion 30 for delivering the sheet to this conveying portion 13, a fixing unit 27 for fixing the image (toner image) formed on the sheet after transfer, and a re-feeding path 35 for forming another image on the underside of the sheet after fixing.

Paper feed portion 30 is composed of multiple cassettes paper feeders 31, 32 and 33 and a manual bypass feeder 34 allowing a sheet of a necessary size to be fed as appropriate.

Provided on the downstream side of fixing unit 27 is a post-processing unit 14 which receives the sheets with images recorded thereon and subjects the sheets to predetermined processes.

Concerning laser writing unit 25 and electrophotographic processing unit 26, the image data loaded from the image memory is supplied to laser writing unit 25, which scans the laser beam being modulated based on the image data to create a static latent image on the photosensitive drum surface. This latent image is developed into a toner image, which is electrostatically transferred to the paper being conveyed from one of the paper feeders 31 to 34 in the multi-layered paper feed unit.

The sheet with an image thus formed thereon is conveyed into post-processing unit 14 by way of fixing unit 27 and discharge rollers 36.

Figure 2:
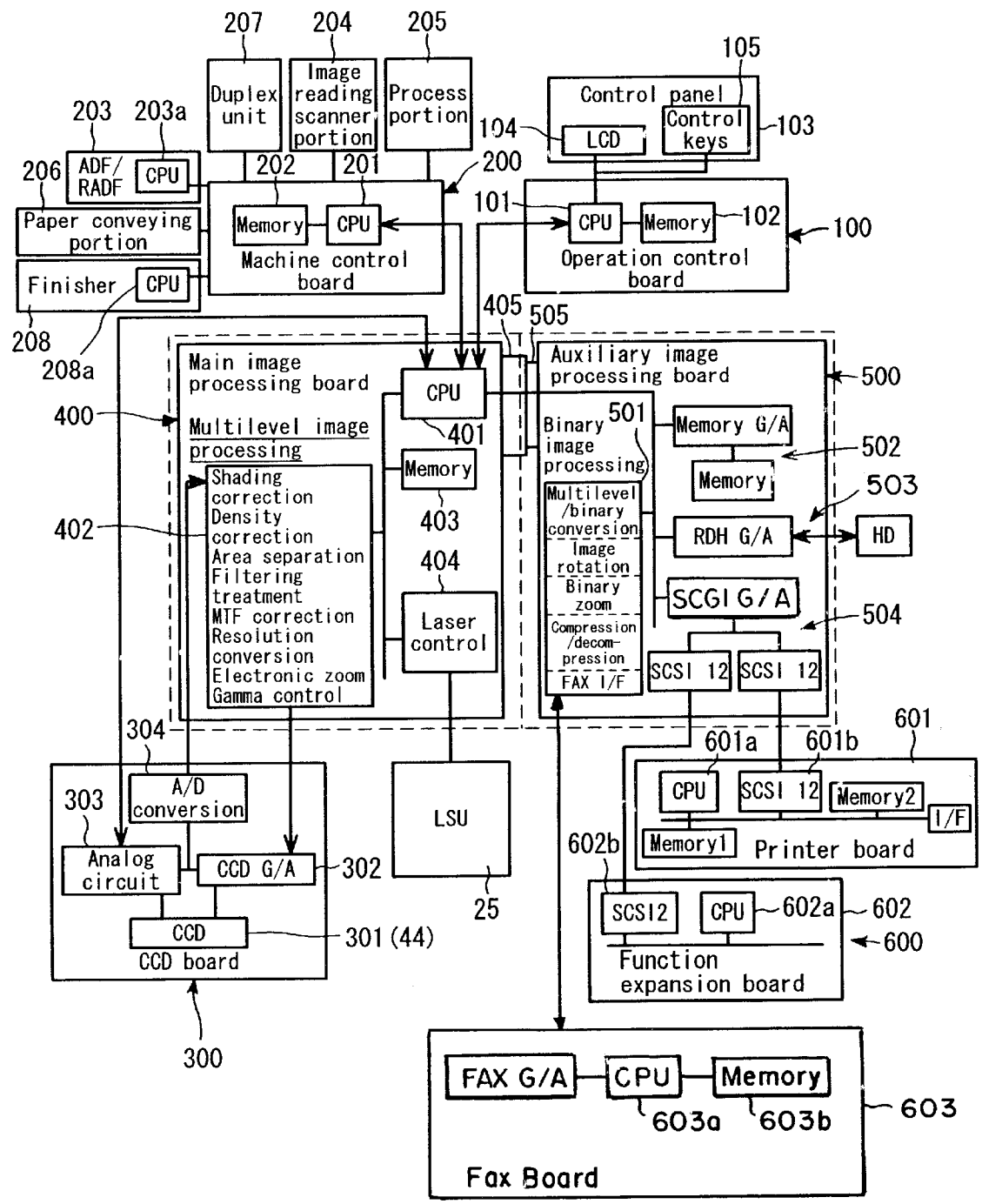
FIG. 2 is a block diagram showing the overall configuration including various units, image processor, etc., constituting the digital copier shown in FIG. 1.

As shown in FIG. 2, in digital copier 10, a main central processing unit (to be referred to hereinbelow as CPU) 401 provided on a main image processing board 400 controls the operation of this digital copier 10 in cooperation with the auxiliary processing units (CPUs: a CPU 101 on an operation panel board 100, CPU 201 on a machine control board 200, CPU 203a for ADF and RADF, CPU 208a for a finisher 208, CPU 603a on a facsimile board 603, etc.).

Digital copier 10 includes: operation panel board 100 for managing and controlling a control panel 103; machine control board 200 for managing and controlling the various units constituting digital copier 10; a CCD board 300 for electrically reading the original image and converting it into electronic data; a main image processing board 400 for subjecting the electronic data converted from the original image through CCD board 300 to predetermined image processes; an auxiliary image processing board 500 for subjecting the image information having been processed through main image processing board 400 to additional predetermined image processes; and an expansion board group 600 (of a printer board 601, function-expansion board 602, fax board 603) connected to auxiliary image processing board 500 via interfaces.

Management and control in each board will be described next.

<Operation Panel Board>

Operation panel board 100 is basically controlled by an auxiliary central processing unit (to be referred to hereinbelow as CPU) 101 and manages the display screen of a LCD display portion 104 arranged on a control panel 103, and the control input through a control key group 105 that allows for input of codes and commands relating to the various modes.

This operation panel board 100 also has a memory 102 for storing the data input through control key group 105, various pieces of control information such as the information to be displayed on LCD display portion 104.

In this operation panel board 100, auxiliary CPU 101 communicates control data with main CPU 401 so as to direct the operation of digital copier 10. Main CPU 401 issues control signals indicating the operational state of digital copier 10 to auxiliary CPU 101, so as to inform the user of the current operational state through LCD display portion 104 on control panel 103.

<Machine Control Board>

Machine control board 200 is controlled by auxiliary CPU 201, and controls a memory 202, an automatic document feeder 203 such as ADF, RADF or the like, a scanner portion 204 for reading original images, a process portion 205 for reproducing the image from the image information, a paper conveying portion 206 for conveying the paper on which the image is recorded, continuously from the storage portion toward process portion 205, a duplex unit 207 for inverting the paper having an image formed on one side thereof and conveying it so that images are formed on both sides of the paper, and a finisher 208 for effecting post-treatments such as stapling the image recorded sheets and other components.

<CCD Board>

CCD board 300 includes: a CCD 301 for electrically reading the original image; a circuit(to be referred to hereinbelow as CCD gate array) 302 for driving CCD 301; an analog circuit 303 for performing gain control of analog data output from CCD 301; and an A/D converter 304 for converting the analog output from CCD 301 into electronic data of digital signals.

Control of these units is performed by main CPU 401.

<Main Image Processing Board>

Main image processing board 400 is controlled by main CPU 401 and includes: a multilevel image processor 402 for processing the electronic data of the original image transferred from CCD board 300 to reproduce the original image with desired tones; a memory 403 for storing the processed image data and various control information such as processing sequence control etc.; and a laser controller 404 for transferring the thus processed image information to laser writing unit 25.

Multilevel image processor 402 directly handles the multilevel image data and subjects it to shading correction, density correction, area separation, filtering treatment, MTF correction, resolution conversion, electric zooming (magnification variation), gamma control and the like. The image information thus processed is transferred to laser writing unit 25 by way of laser controller 404 and reproduced as an image.

<Auxiliary Image Processing Board>

Auxiliary image processing board 500 is joined to main image processing board 400 via connectors 505 and 405 and is controlled by main CPU 401 on main image processing board 400.

This auxiliary image processing board 500 includes: a binary image processor 501; a memory portion 502 made up of a memory for storing and managing the binary image information having undergone the image processing and the control information etc., and a memory gate array; a hard disc portion 503 made up of a hard disc for storing and controlling the information as to multiple original images and a hard disc gate array; and a SCSI interface portion 504 made up of a SCSI and a SCSI gate array.

Binary image processor 501 includes: a multilevel-to-binary converter for converting the multilevel image information into binary image data; an image rotating processor for rotating images; a binary zooming processor for varying the size of binary images; and a facsimile interface.

Since a hard disc is a mass storage device, it is able to store the information of multiple original images and repeatedly load the original image information the number of times the copies are needed to produce multiple sets of duplications.

<Expansion Boards>

Expansion boards 600 include: a printer board 601; a function expansion board 602; and a facsimile board 603. Printer board 601 is a board which enables the data transferred from a personal computer etc., to be output in the printer mode from laser recording portion 12 of digital copier 10, and is provided with a CPU 601a and SCSI interface 601b. Function expansion board 602 is a board which makes possible full use of the features of digital copier 10 by expanding the editing function of digital copier 10 and is provided with a CPU 602a and SCSI interface 602b. Facsimile board 603 is a board which enables transmission of original images read through scanner portion 11 of digital copier 10 to a remote site and output of the image information sent from a remote site by means of laser recording portion 12 of digital copier 10 and is provided with a CPU 603a and memory 603b.

Next, the image data processing and the flow of the image data in copy mode, facsimile mode and printer mode in the digital copier 10 will be described in further detail.

<Copy Mode>

The originals set in the predetermined position of RADF 16 are successively fed, one by one, onto original table 15 of scanner unit 20. The images of the originals are successively read by scanner unit 20 and transferred as 8-bit electronic data to main image processing board 400.

The 8-bit electronic data transferred to main image processing board 400 is subjected as electronic image data of 8 bits to the predetermined processes through multilevel image processor 402. The 8-bit electronic image data is passed through gamma control and other processes and then is sent to laser writing unit 25 by way of laser controller 404.

The original image read by scanner portion 11 in the above sequence is output as a copy image with tones from laser recording portion 12.

<Electronic RDH Function in Copy Mode>

As above, the originals set in the predetermined position of RADF 16 are successively fed, one by one, onto original table 15 of scanner unit 20. The images of the originals are successively scanned by scanner unit 20 and transferred as 8-bit electronic data to main image processing board 400.

The 8-bit electronic data transferred to main image processing board 400 is subjected as electronic image data of 8 bits to the predetermined processes through multilevel image processor 402. The 8-bit electronic image data is then sent to auxiliary image processing board 500 by way of the joint between connectors 405 and 505.

In auxiliary image processing board 500, the 8-bit electronic image data is processed through the multilevel/binary converter of binary image processor 501 where the data is converted into 2-bit electronic image data whilst being subjected to error diffusion and other processes. subjected to error diffusion and other processes when it is converted into 2-bit electronic image data is that mere execution of multilevel/binary conversion will degrade image quality. Actually, when the 8-bit electronic image data is converted into 2-bit electronic image data whilst being subjected to error diffusion and other processes, it is possible to reduce the image degradation to minimum. Further, conversion into 2-bit electronic image data makes it possible to reduce the storage volume of the images.

The thus converted 2-bit electronic image data is transferred, page by page, to the mass storage, i.e., hard disc portion 503 and temporarily stored therein.

When the set of originals placed in RADF 16 has been thoroughly read, the 2-bit electronic image data temporarily stored in hard disc portion 503 is repeatedly loaded the designated number of times, by gate array control. Then the data is sent to main image processing board 400 by way of the joint between connectors 405 and 505. In the main image processing board 400, the image data is subjected to gamma control and other processes and then transferred to laser writing unit 25 by way of laser controller 404.

In the above description of this embodiment, the system is configured so that all the images of the set originals are read first and then the set of images is repeatedly loaded the number of times the copies are needed. However, it is possible to configure a system such that the first set of copies will be output when the predetermined number of images have been prepared.

The original images thus read by scanner portion 11 are output from laser recording portion 12 as copied images with tones.

<Printer Mode>

Images sent from an external, networked, device such as a personal computer etc., are expanded pagewise on printer board 601, then the data is temporarily transferred by way of SCSI interface portion 504, to auxiliary image processing board 500, where it is stored into hard disc portion 503.

The images expanded pagewise on printer board 601 are sent to auxiliary image processing board 500. In this case, however, the pagewise image is merely stored temporarily into hard disc portion 503 without execution of binarizing image processing.

Further, when the page-wise images temporarily stored are loaded from hard disc portion 503, no binarizing image processing of the pagewise images is carried out either.

The image information, temporarily stored in hard disc portion 503, is loaded from hard disc portion 503 so that the loaded data is collated in the predetermined page order and transferred to main image processing board 400. In main image processing board 400, the data is subjected to gamma control and then supplied to laser controller 404 which in turn controls image writing of laser writing unit 25 to perform image reproduction.

Arranged on the screen of a touch panel LCD device 40 is an input area for changing the display into the setting frame. As the operator directly presses this area with a finger, a menu of various editing functions as the setting frame is displayed on the screen of touch panel LCD device 40.

When the operator selects the desired function from the menu of the various editing functions displayed on the setting frame, by touching the area where the desired function is displayed with the finger, the editing function is set up.

<Control Panel>

Figure 3:
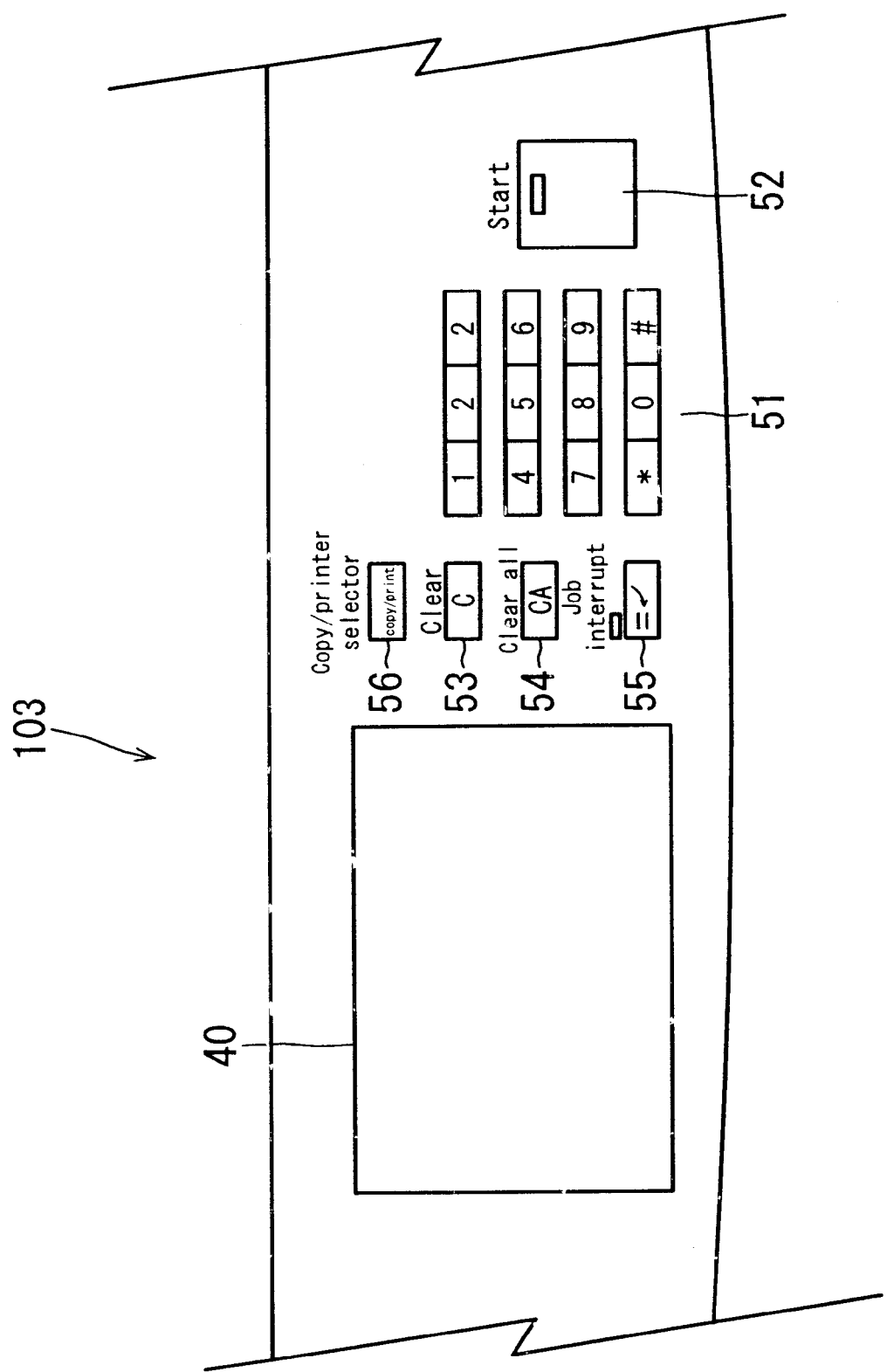
FIG. 3 is a plan view showing a control panel in accordance with one embodiment of the input display system.

FIG. 3 is a plan view showing control panel 103 provided in digital copier 10.

As shown in FIG. 3, touch-panel type LCD device 40 as one embodiment of the input display system according to the present invention is deposed in the center of this control panel 103. Arranged around the LCD device are a ten key pad 51, start key 52, clear key 53, clear all key 54, job interrupt key 55 and copier/printer select key 56.

Briefly describing these setting keys arranged on control panel 103, ten key pad 51 includes keys for setting the number of copies. Clear key 53 is the key to clear the number of copies or to be operated when a continuous copy operation is stopped. Start key 52 is the key for commanding the start of a copying operation. Clear all key 54 is the key to reset all the currently set modes and conditions and restore the standard state. Job interrupt key 55 is the key for interrupting the copy operation in progress and starting a copying operation of another set of documents. Copier/printer select key 56 is the key for switching the operational mode of digital copier 10 between the copier and printer modes.

The above described control panel 103 and all the keys arranged on control panel 103 may change as appropriate depending upon the functions provided for digital copier 10.

<Display Frame in Touch-panel LCD Device>

The processing of the above-described digital copier 10 will be described taking as an example of the operation during copy mode.

Figure 4:
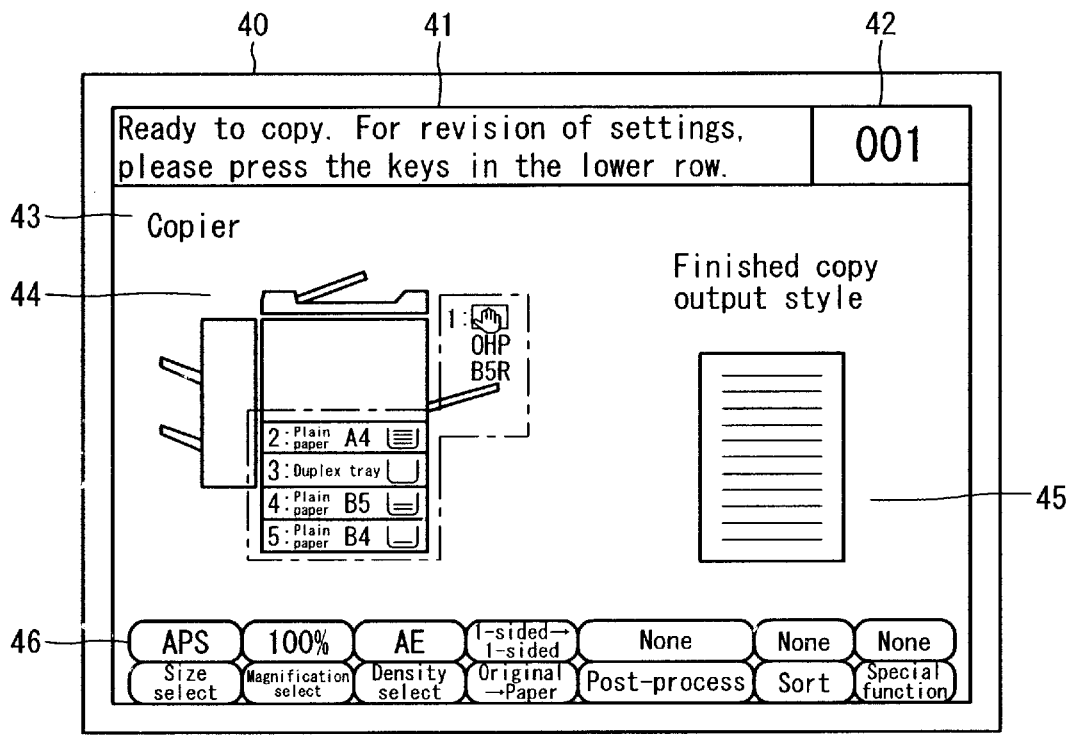
FIG. 4 is an illustrative view showing the top frame, displayed on the display screen.

Once the copier mode is selected, a top frame appears on the screen of touch-panel LCD device 40 (see FIG. 4). The graphic display in this top frame is mainly made up of a message display area 41, copy number display area 42, mode display area 43, pictorial outline display area 44, finished copy output style display area 45, setting key display area 46.

Pictorial outline display area 44 displays the main machine, additional optional units (ADF, sorter, duplex tray, multi-layered desk and the like). For each tray in the illustration, paper type, size, placement orientation, residual quantity are displayed. The tray to which printed sheets are discharged in the currently set conditions is enhanced or highlighted in the display compared to the other trays.

Displayed in setting key display area 46 are setting keys for entering the print conditions. This setting key display area 46 is composed of two rows: the lower row in FIG. 4 of user select keys for condition setup and the upper row in FIG. 4 of displaying the current setup status of each setup item.

Finished copy output style display area 45 displays the conditions which have been set up through the conditions keys and are displayable with pictorial representations, whereby the user is able to know beforehand in what form the printouts will be presented.

Message display area 41 displays messages to the user.

Copy quantity display area 42 displays the set quantity of copies (the residual quantity is displayed during a copy run).

Mode display area 43 displays the mode currently set.

When the setup conditions need to be changed in the top frame, the conditions as to paper size, magnification and density can be selected or revised by operating the associated setting keys. That is, the user is able to select the desired conditions in this top frame.

Figure 5:
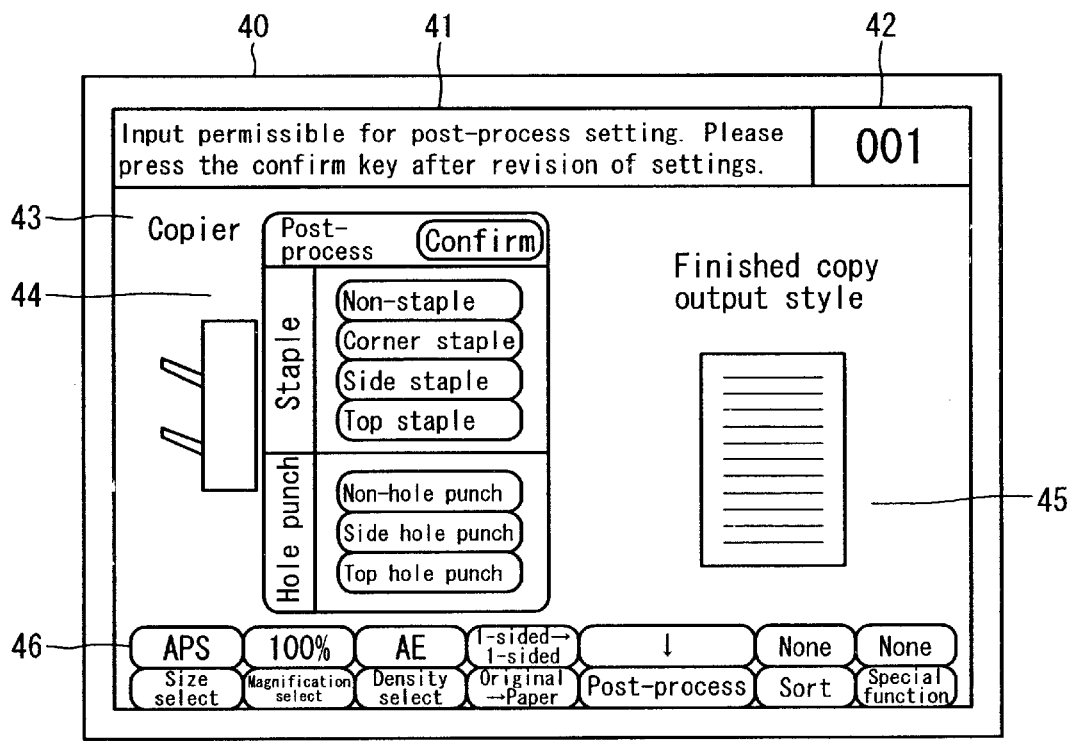
FIG. 5 is an illustrative view showing a setting frame for designating post-process conditions, displayed on the display screen.

Other than these conditions, when, for example, the settings of post-process conditions are revised, touching the post-process setting key changes the view of the top frame into the post-process condition setting frame (see FIG. 5). In this post-process condition setting frame, the current conditions for post-processing are displayed in the setting frame while a 'downward arrow' is displayed in the status indicator in the upper row of setting key display area 46 to show that the condition selection is in progress. In this case, pictorial outline display area 44 displays only the outline view of the post-processor with other units hidden. After the selection is completed, touching the confirm key displayed on the screen makes the display return to the top frame.

Figure 6:
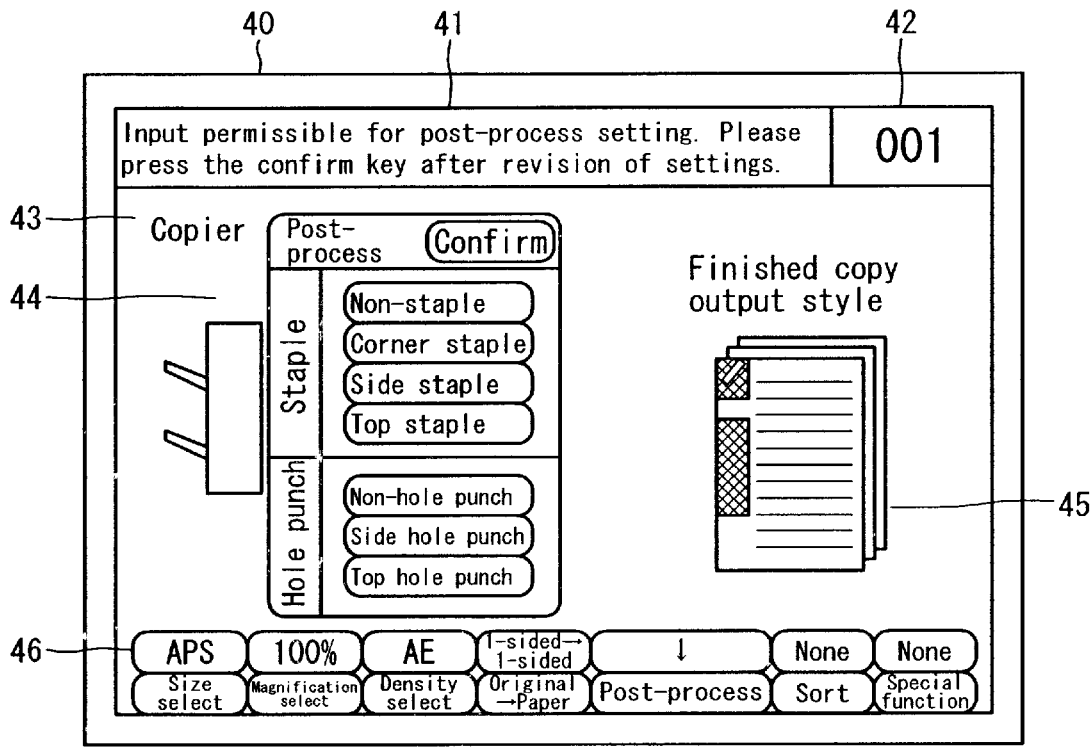
FIG. 6 is an illustrative view showing a setting frame for designating post-process conditions, displayed on the display screen.
Figure 7:
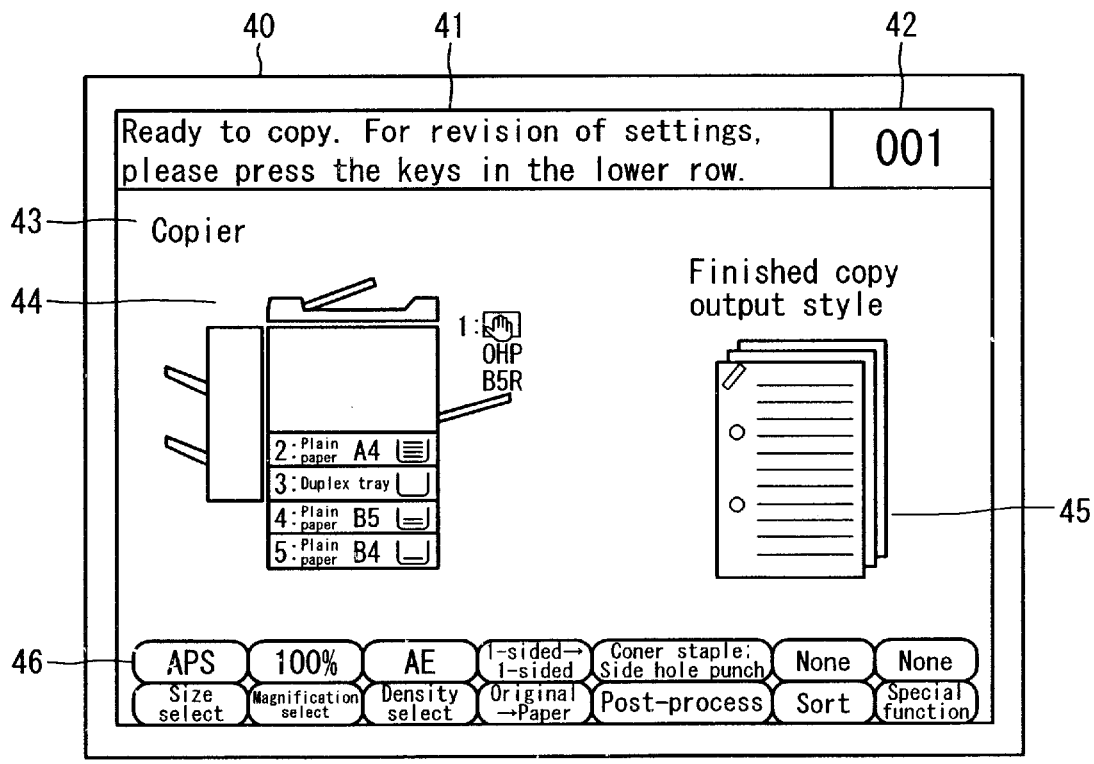
FIG. 7 is an illustrative view showing the top frame, displayed on the display screen.

For example in a setting frame for post-process conditions as shown in FIG. 5, when the setup conditions are revised, the pictorial representations of the finished copy output style also change as shown in FIG. 6 in response to the modification. In the digital copier 10 of this embodiment, a multiple number of paper output trays are arranged including, for example, from the top, a copy output tray and a large quantity copy and post-processor output tray. When a post-treatment such as stapling, hole punching or the like is selected in a setting frame for the post-process conditions shown in FIG. 6, the printouts are discharged to the post-processing output tray, so that the post-processing output tray is highlighted. As the confirm key displayed on the screen is operated in the selection state shown in FIG. 6, the view returns to the top frame shown in FIG. 7.

<Setting Frame: Setting the Binding Margin>

Next, taking 'binding margin' as an example of a special function setting, after setting the post-process conditions, the setting of conditions using setting keys and the change in the pictorial view of the finished copy output style corresponding to the settings will be illustrated.

First, the post-process setup conditions are entered. As the post-process setting key is selected from the condition setting keys in the top frame shown in FIG. 4, the display of a setting frame changes to that for the post-process conditions shown in FIG. 5. Here, the 'downward arrow' is displayed in the status indicator in the upper row of setting key display area 46 to show that the condition selection is in progress.

As shown in FIG. 5, the post-process conditions includes stapling and hole punching functions. For the stapling function, there are stapling status options available ('non-staple', 'corner staple', 'side staple' and 'top staple'). For the hole punching function, there are hole punching status options available ('non-hole punch', 'side hole punch' and 'top hole punch'). In the setting frame, the post-process conditions corresponding to the current machine status are displayed with highlighting. For example, as shown in FIG. 5, 'non-staple' is highlighted for the staple condition and 'non-hole punch' is highlighted for the hole punch condition.

Now, when the staple function 'corner staple' and the hole punch function 'side hole punch' are selected, the display of finished copy output style display area 45 changes to the picture representing the corner stapling and side hole punching, in correspondence with the selected conditions (the display changes from the state shown in FIG. 5 to that shown in FIG. 6.).

Further, in the finished copy output style display area 45, the set conditions (areas to be stapled and hole punched) are displayed with halftone dot meshing. As the confirm key displayed on the screen is operated with this selection state, the display changes to the top frame with a view shown in FIG. 7, where 'corner staple and side hole punch' are displayed in the status indicators in the upper row of setting key display area 46. Here in this state, because no input is allowed to the post-process conditions after the confirm key is pressed, the halftone dot meshing in the finished copy output style display area 45 is cancelled. In this state, since only the post-processing function was selected, stapling and hole punching alone are displayed in the picture of finished copy output style display area 45.

Next, setting of a special function is performed. First, as the special function key is selected from the condition setting keys shown in FIG. 7, the view in the setting frame changes to that for special function settings(see FIG. 8). In this state, a 'downward arrow' is displayed in the status indicator in the upper row of setting key display area 46 so as to show that the condition selection is in progress.

Figure 8:
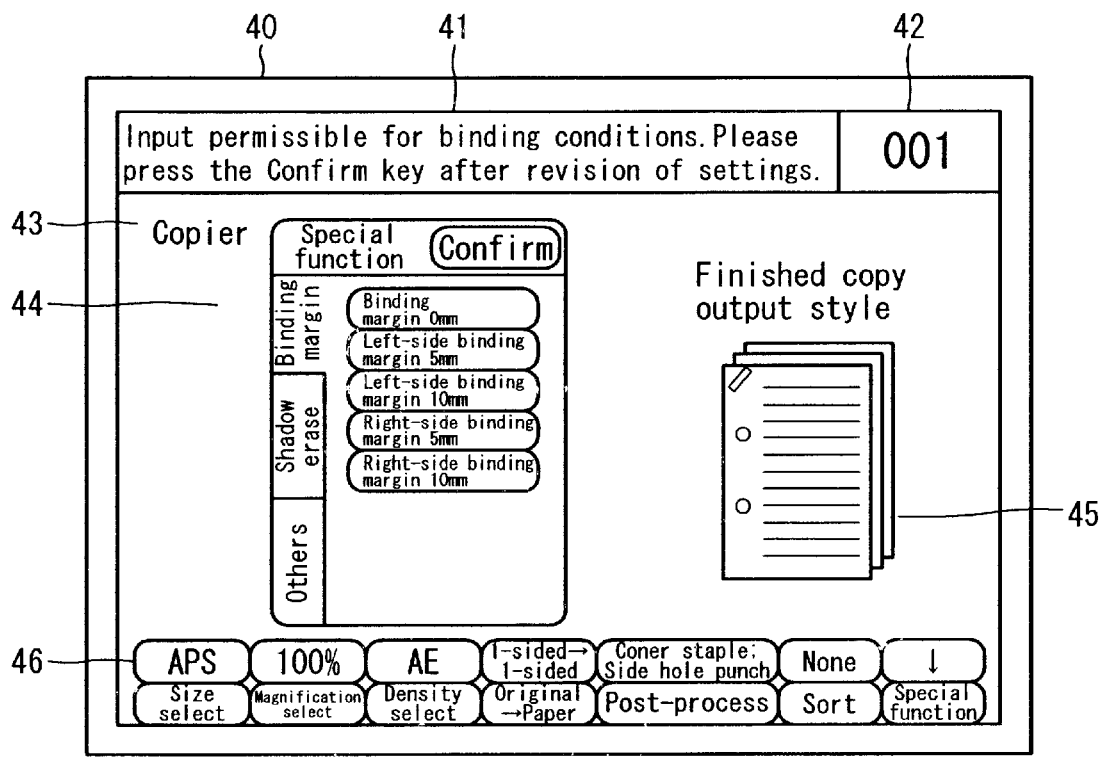
FIG. 8 is an illustrative view showing a setting frame for designating the conditions for special functions, displayed on the display screen.
Figure 9:
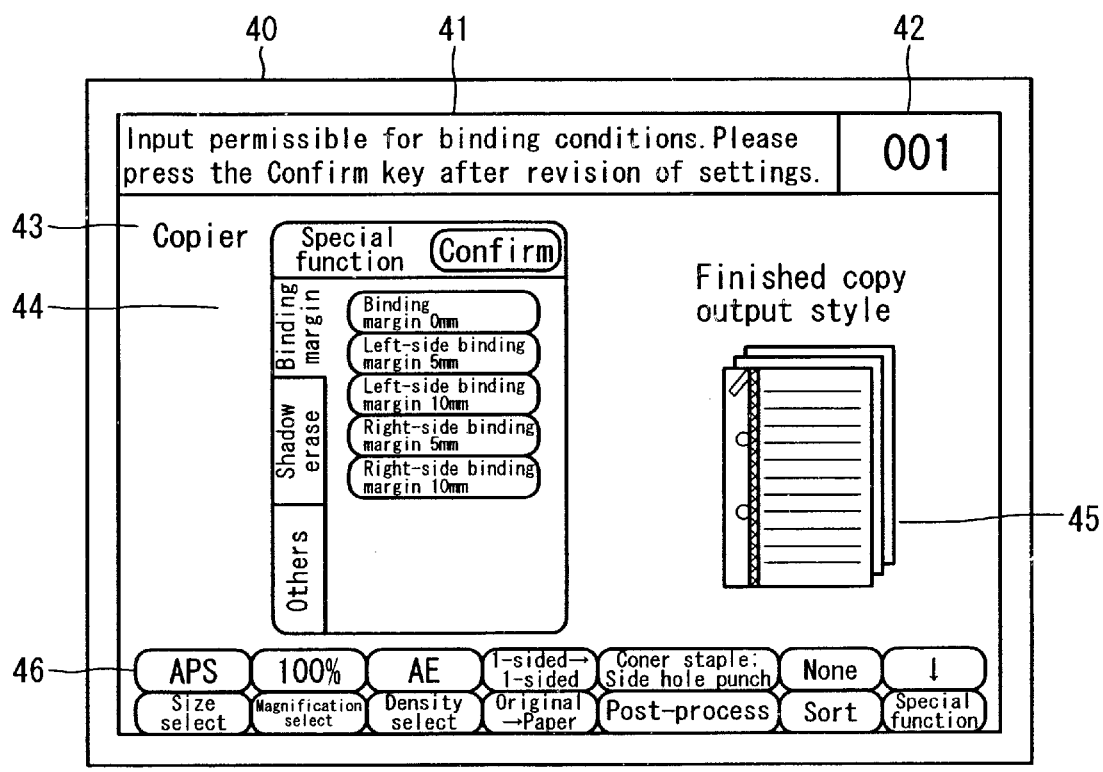
FIG. 9 is an illustrative view showing a setting frame for designating the conditions for special functions, displayed on the display screen.

Here, it is assumed that the binding margin function is selected from the special functions. As shown in FIG. 8, for setting a binding margin, a margin measurement ('0 mm margin', '5 mm left-side binding margin', '10 mm left-side binding margin', '5 mm right-side binding margin' and '10 mm right-side binding margin') can be selected. In this setting frame, the currently set special function settings are displayed: in the picture, '0 mm margin' for the binding margin function is displayed with highlighting. When the '5 mm left-side binding margin' is selected for the binding margin function, the display in finished copy output style display area 45 changes to the picture with copies bound on the left side (see FIG. 9). In this state, the area along the left binding margin is displayed with halftone dot meshing so as to distinguish the pictorial representation in the input-active setting frame from that in the input-inactive frame. That is, in the example shown in FIG. 9, the area along the left binding margin is made distinctive from the staple and hole punch representations.

Figure 10:
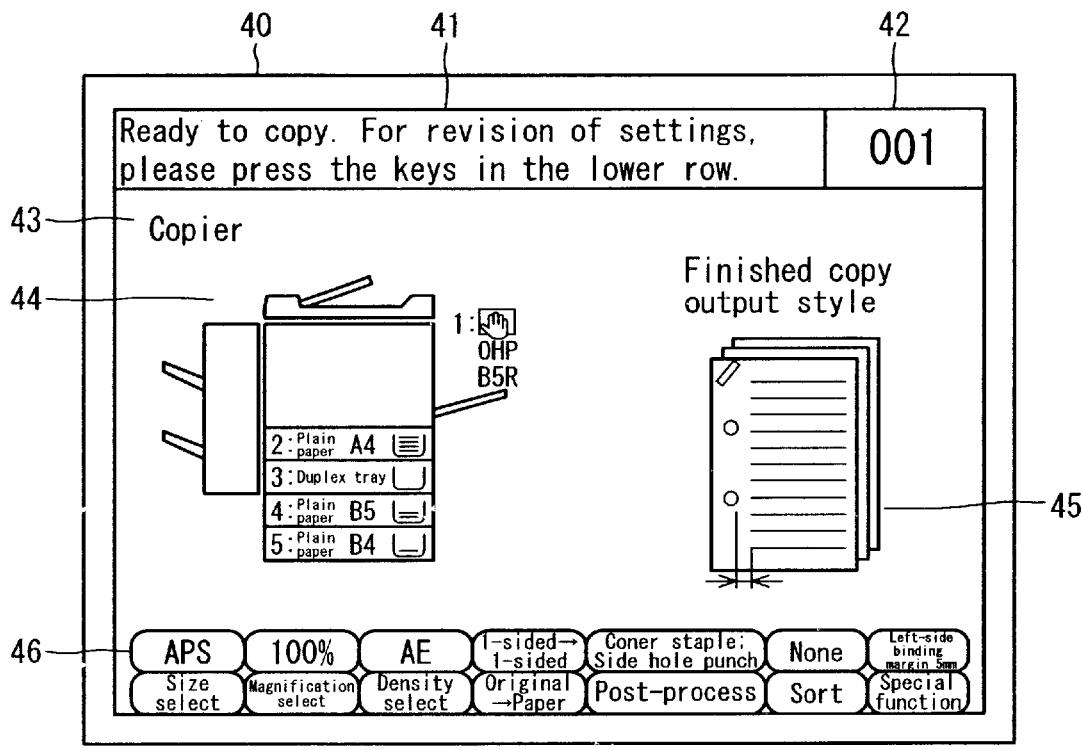
FIG. 10 is an illustrative view showing the top frame, displayed on the display screen.

As the confirm key displayed on the screen is operated with this selection state, the display changes to the top frame with a view shown in FIG. 10, where the setup condition (5 mm left-side binding margin) is displayed in the status indicator in the upper row of setting key display area 46. In this state, since the binding margin function and post-processing function are set up, the pictorial representations of 5 mm left-side binding margin and stapling and hole punching are integrally illustrated in finished copy output style display area 45 (see FIG. 10).

In the above way, multiple settings input through conditions keys of two or more setting frames are displayed in an integrated manner while conditions represented pictorially in correspondence to the setting keys in the input-active setting frame are made visually distinguishable (with hatching, color, halftone dot meshing, etc.) from the pictorially represented conditions corresponding to the setting keys in the input-inactive setting frame. With this arrangement, it is possible for the user to easily check and recognize the current setup conditions. Further, since multiple input settings are displayed integrally, it is possible to readily check and recognize its finished copy output style and hence reduce miscopies.

Since only the setup conditions are integrally shown in the pictorial outline with other default settings undisplayed, it is possible to provide an easy-to-recognize frame display with less confusion compared to the case where the other setup conditions are displayed at the same time. This makes it possible to prevent setting errors.

<Setting Frame: Back Key Operation>

Next, description will be made of the back key by taking 'erase shadow' as an example of a special function being set up after designation of the post-process settings. In this example, the back key is used to cancel the previously set condition and restore the state immediately before, and activate the setting frame corresponding to that condition.

First, settings of the post-processing status are entered in the same procedures as above. That is, as the post-process setting key is selected from the condition setting keys in the top frame shown in FIG. 4, the view on the display changes to the setting frame for selecting the post-process conditions shown in FIG. 5. As post-process settings, the staple function 'corner staple' and the hole punch function 'side hole punch' are selected (see FIGS. 5, 6 and 7).

Figure 11:
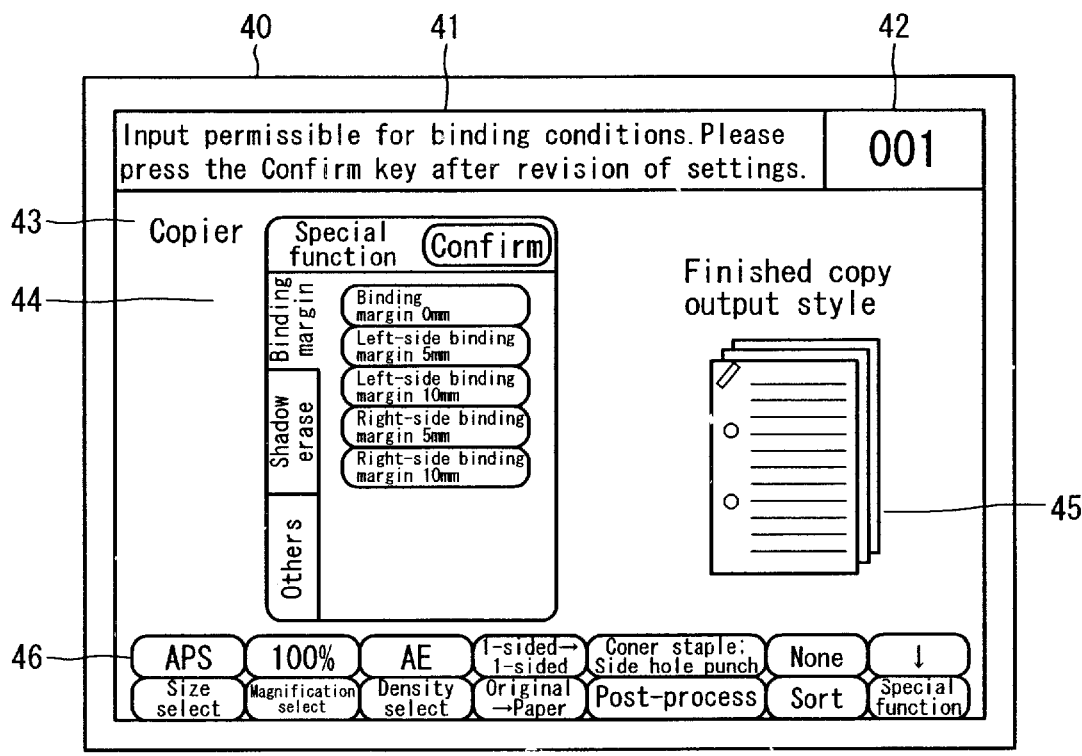
FIG. 11 is an illustrative view showing a setting frame for designating the conditions for special functions, displayed of the display screen.
Figure 12:
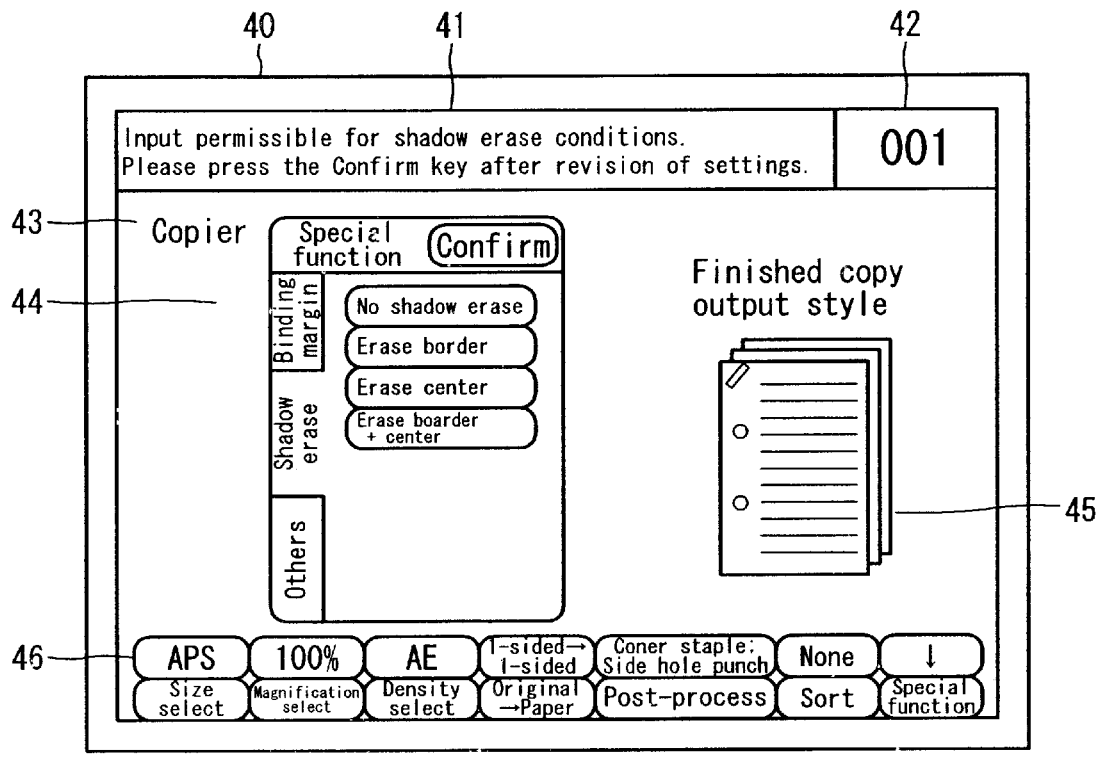
FIG. 12 is an illustrative view showing a setting frame for designating the conditions for special functions, displayed on the display screen.
Figure 13:
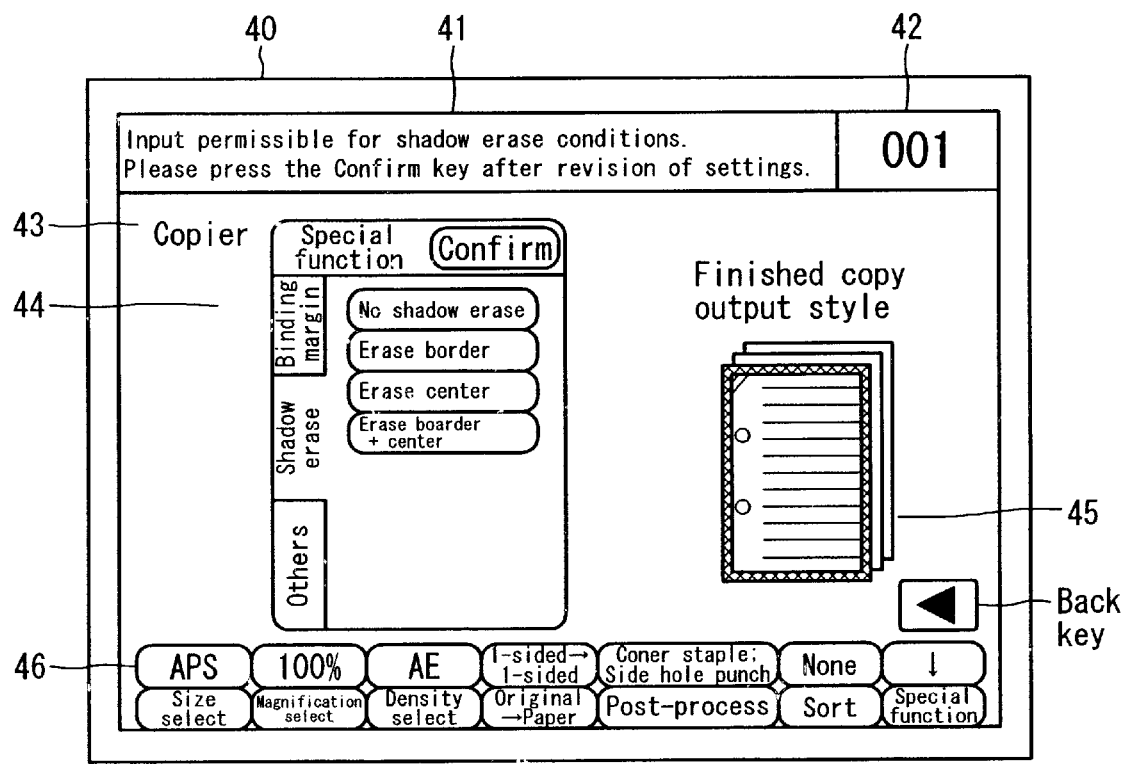
FIG. 13 is an illustrative view showing a setting frame for designating the conditions for special functions, displayed on the display screen.

Then, the special function key of the setting keys is selected (see FIGS. 7 and 11), the shadow erase function is selected from the function setting frame (see FIGS. 11 and 12). This selection mode of the shadow erase function includes four options, namely, 'non-erase', 'erase border', 'erase center' and 'erase border+erase center'. From this, 'erase boarder' is selected (see FIG. 13), the confirm key displayed on the screen is operated to complete the setup.

Figure 14:
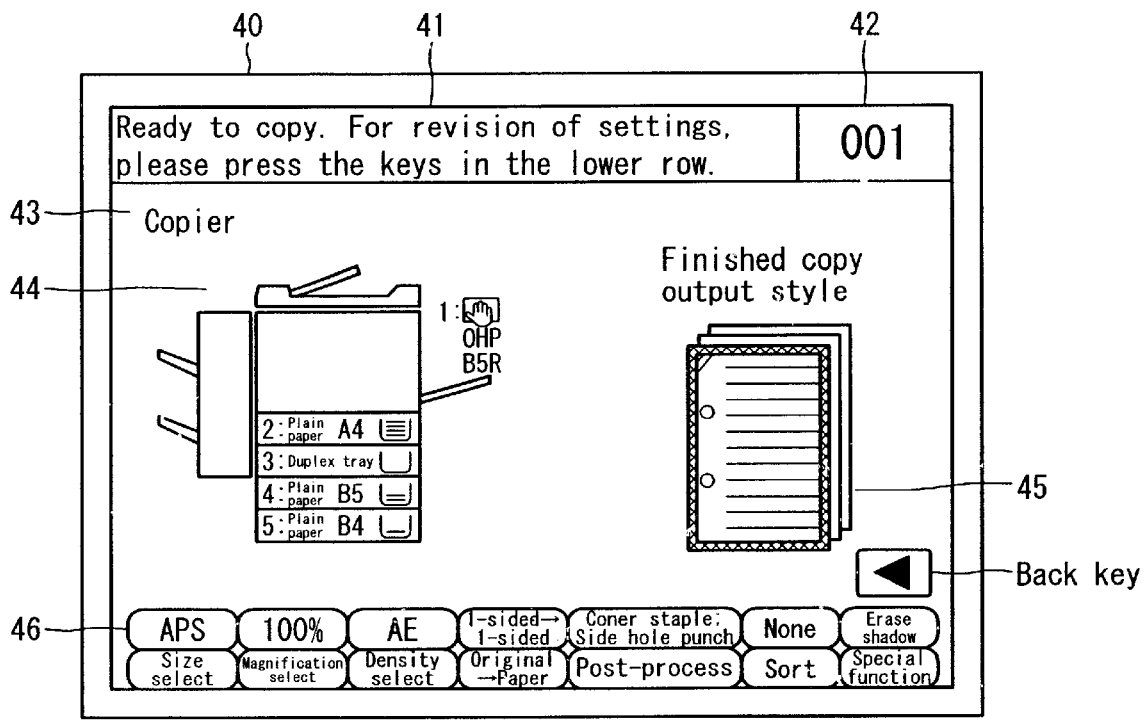
FIG. 14 is an illustrative view showing the top frame, displayed on the display screen.

When the setup is completed, the view returns to the top frame shown in FIG. 14 where the above setup conditions 'corner staple and side hole punch' and 'boarder erase' are displayed in the status indicators in the upper row of setting key display area 46 and the picture in finished copy output style display area 45 is depicted as being stapled and hole punched and its boarder erased. Suppose that the user noticed a setup mistake in this stage, that is, the shadow erase function should be changed from 'erase border' to 'erase center'. In this case, the back key is operated in the setting frame shown in FIG. 14, so that it is possible to return to the previous condition setting frame for the special function 'shadow erase' (see FIG. 13).

In this state, when 'erase center' is selected and the confirm key displayed on the screen is operated, it is possible to revise the condition instead of touching the setting key to select the function. In this way, when resetting and revising the condition set up immediately before, the user no longer needs to perform multiple steps of selecting the desired setting key from the multiple setting keys and selecting the functional condition from the setting frame. Thus, it is possible to reduce the number of key operations and provide an easy condition setup operation.

<Setting Frame: Switching Operation>

Next, description of the procedures of activating a necessary frame, by touching the setup area in the integrally displayed icon as a trigger input will be made taking as an example of setting the special function(binding) after setting the post-process conditions.

First, settings of the post-processing status are entered in the same procedures as above. That is, as the post-process setting key is selected from the condition setting keys in the top frame shown in FIG. 4, the view on the display changes to the setting frame for selecting the post-process conditions shown in FIG. 5. As post-process settings, the staple function 'corner staple' and the hole punch function 'side hole punch' are selected (see FIGS. 5, 6 and 7).

Figure 15:
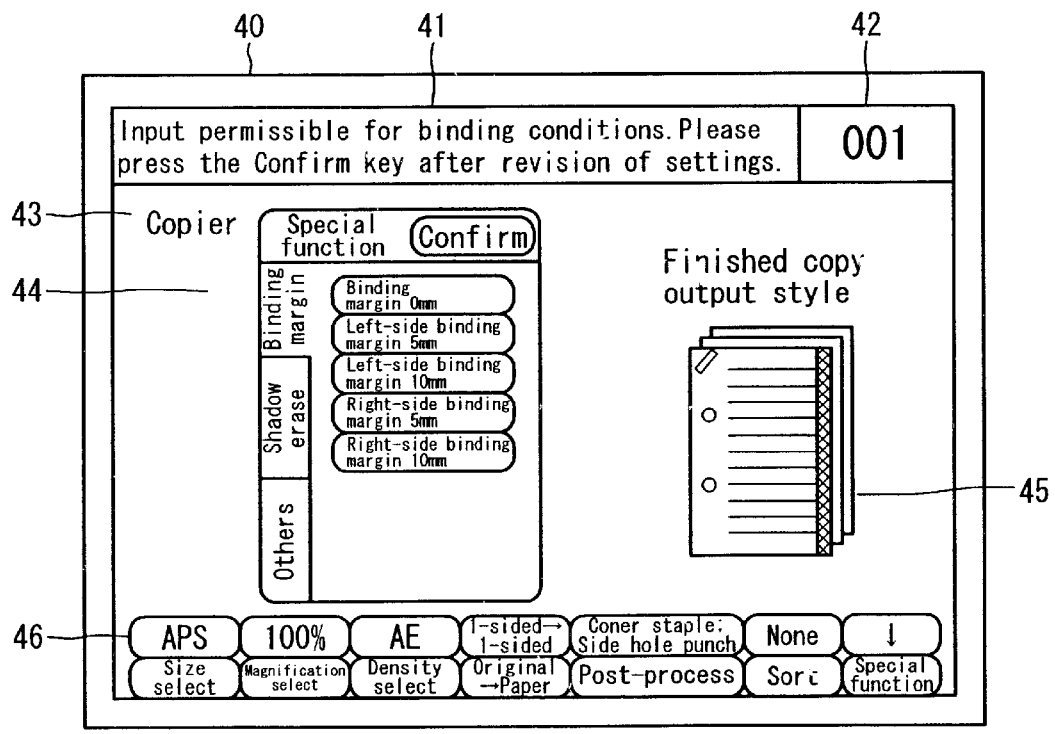
FIG. 15 is an illustrative view showing a setting frame for designating the conditions for special functions, displayed on display screen.
Figure 16:
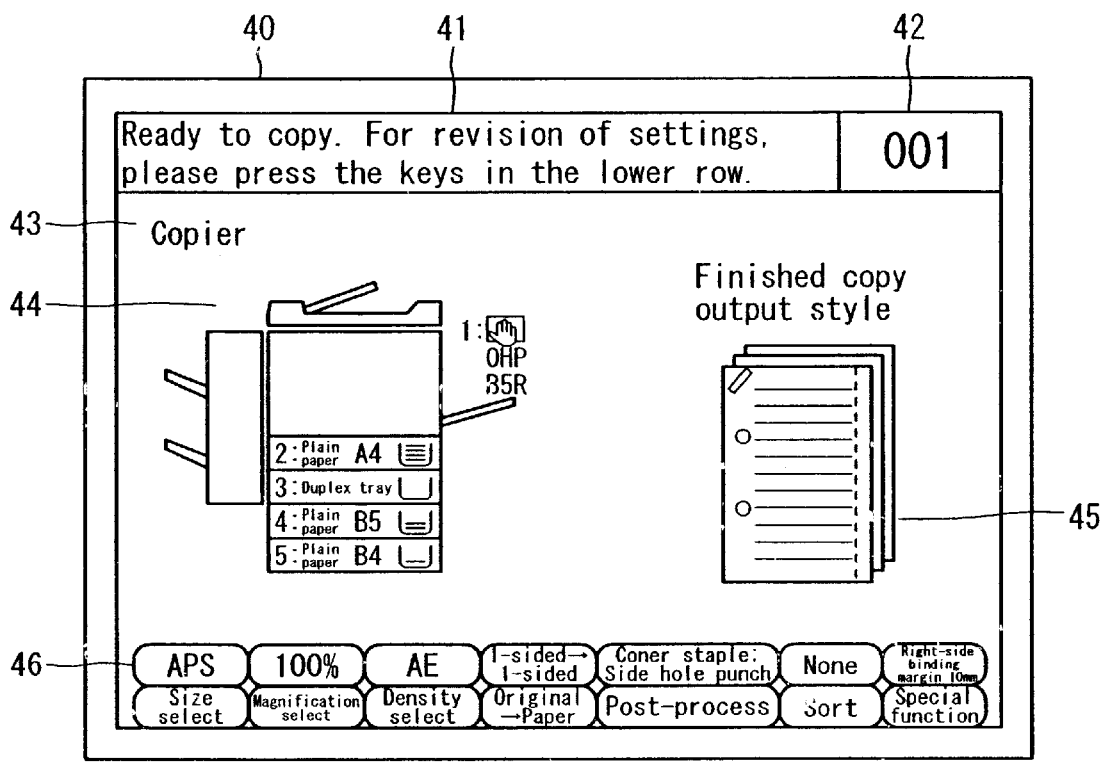
FIG. 16 is an illustrative view showing the top frame, displayed on the display screen.

Then, the special function key of the setting keys is selected, the display shows the setting frame for selecting special f unction conditions (see FIG. 8). In this frame, the binding margin function is selected from the special functions and '10 mm right-side binding margin' is selected as the binding margin condition(see FIG. 15). As the confirm key displayed on the screen is operated to complete the setup, the top frame shown in FIG. 16 is displayed. In this top frame, 'corner staple·side hole punch/10 mm right-side binding margin' is displayed as the settings on the upper row in setting key display area 46. Finished copy output style display area 45 displays an integral pictorial outline of copies stapled and hole punched with their binding margin set at 10 mm on the right side (see FIG. 16).

Suppose that the user noticed a setup mistake in this stage, that is, '10 mm right-side binding margin' should be changed to '10 mm left-side binding margin'. In this case, touching the represented part of the right-side binding margin in the finished copy output style display area causes display change from the top frame shown in FIG. 16 to the setting frame for the special function 'binding margin' shown in FIG. 15.

In this state, '10 mm left-side binding margin' is selected as the binding margin function setting, and the confirm key displayed on the screen is operated to revise the setting condition. In this way, it is possible for the user to make active one of the setting frames for the function setting conditions already designated without touching on the multiple setting keys. Therefore, it is possible to easily revise the setting conditions in the pictorial icon, leading to a further ease in condition setting.

<Setting Frame: Displaying the Finished Copy Output Style>

Next, description will be made of setting of conditions via setting keys and display of the finished copy output style corresponding to these settings, by taking 'erase shadow' as an example of a special function being set up after designation of the post-process settings.

First, settings of the post-processing status are revised in the same procedures as above. That is, as the post-process setting key is selected from the condition setting keys in the top frame shown in FIG. 4, the view on the display changes to the setting frame for selecting the post-process conditions shown in FIG. 5. As post-process settings, the staple function 'corner staple' and the hole punch function 'side hole punch' are selected, the corner staple and side hole punch becomes displayed in conformity with the set conditions(see FIGS. 5 and 17).

Figure 17:
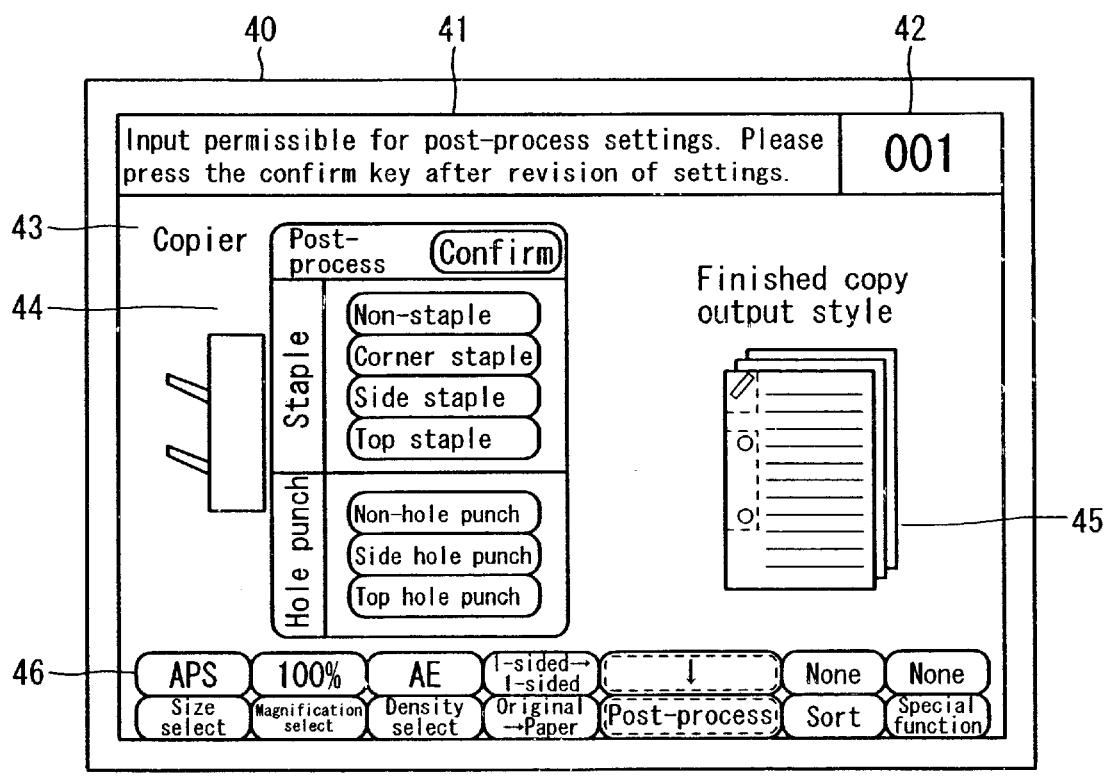
FIG. 17 is an illustrative view showing a setting frame for designating the conditions for special functions, displayed on the display screen.

As seen in FIG. 17, in finished copy output style display area 45, the areas of the designated settings (stapling and hole punching areas) in the icon are enclosed by broken lines. Similarly, the setting keys for post-processing are also displayed with enclosing the broken lines as the pictoral representations in the icon. From this state, the confirm key displayed on the screen is operated so that the top frame shown in FIG. 18 appears with 'corner staple side hole punch' displayed as the setting conditions in the upper row in setting key display area 46.

Since the post-processing conditions become input-inactive when the confirm key is pressed, the broken lines enclosing the stapling and hole punching portions in finished copy output style display area 45 and the post-process setting keys change to thick lines.

Figure 18:
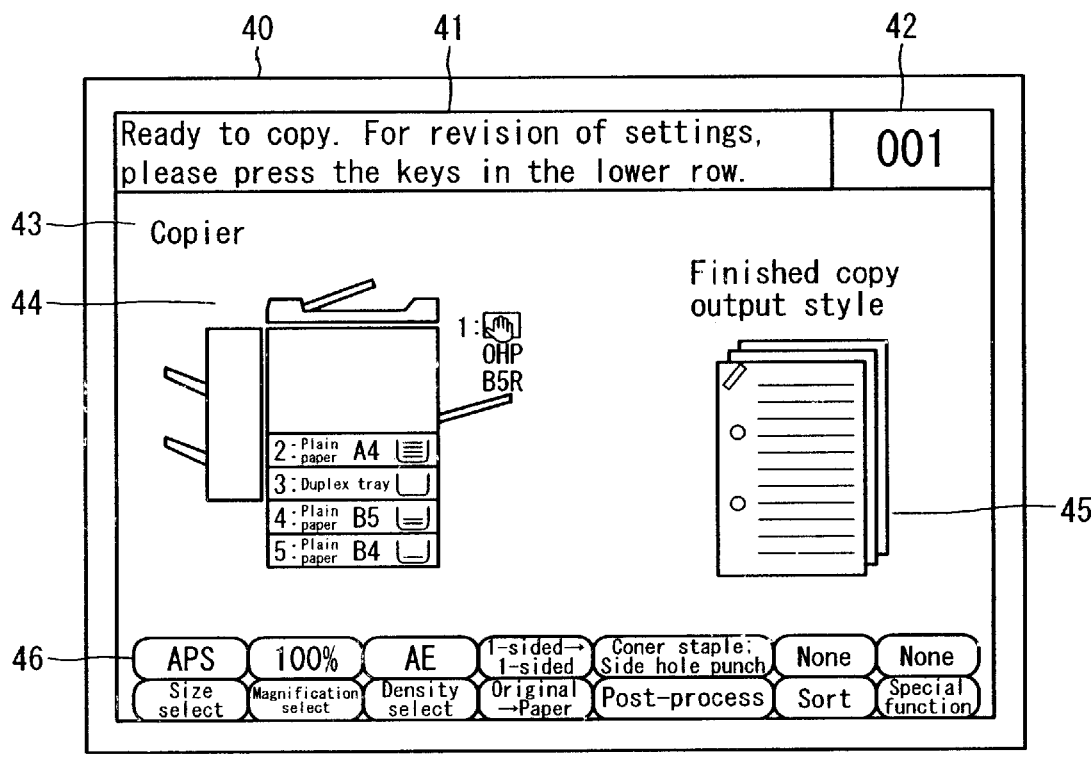
FIG. 18 is an illustrative view showing the top frame, displayed on the display screen.
Figure 19:
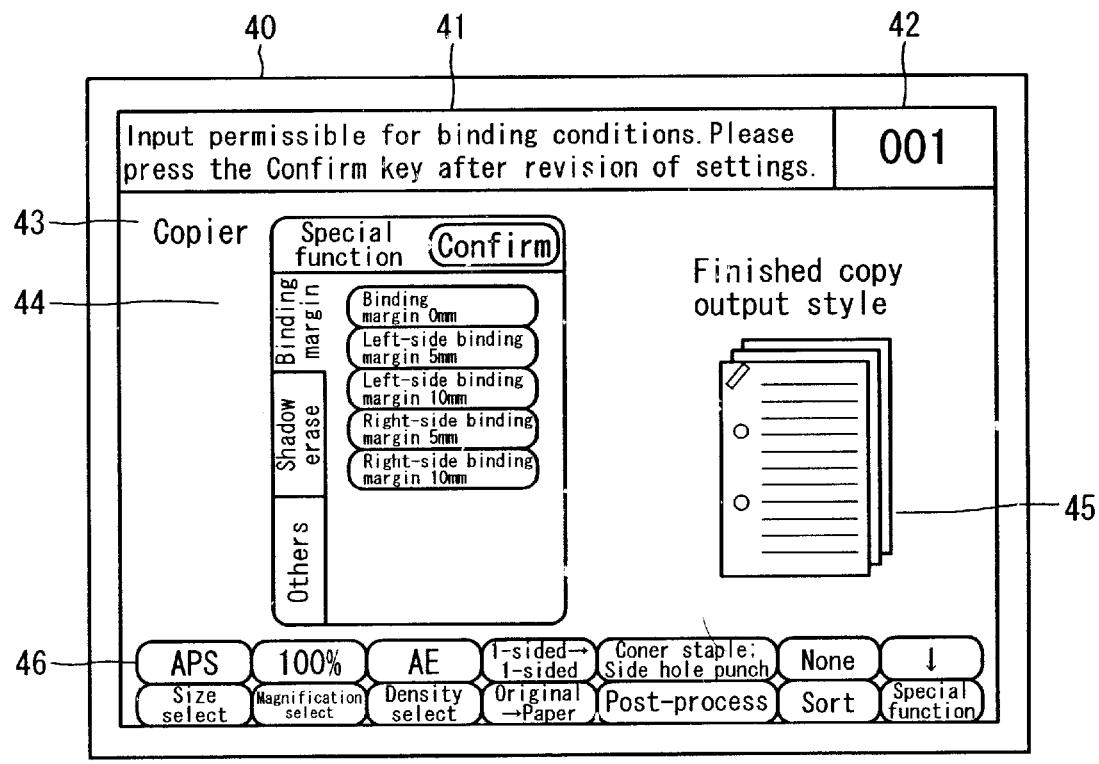
FIG. 19 is an illustrative view showing a setting frame for designating the conditions for special functions, displayed on the display screen.
Figure 20:
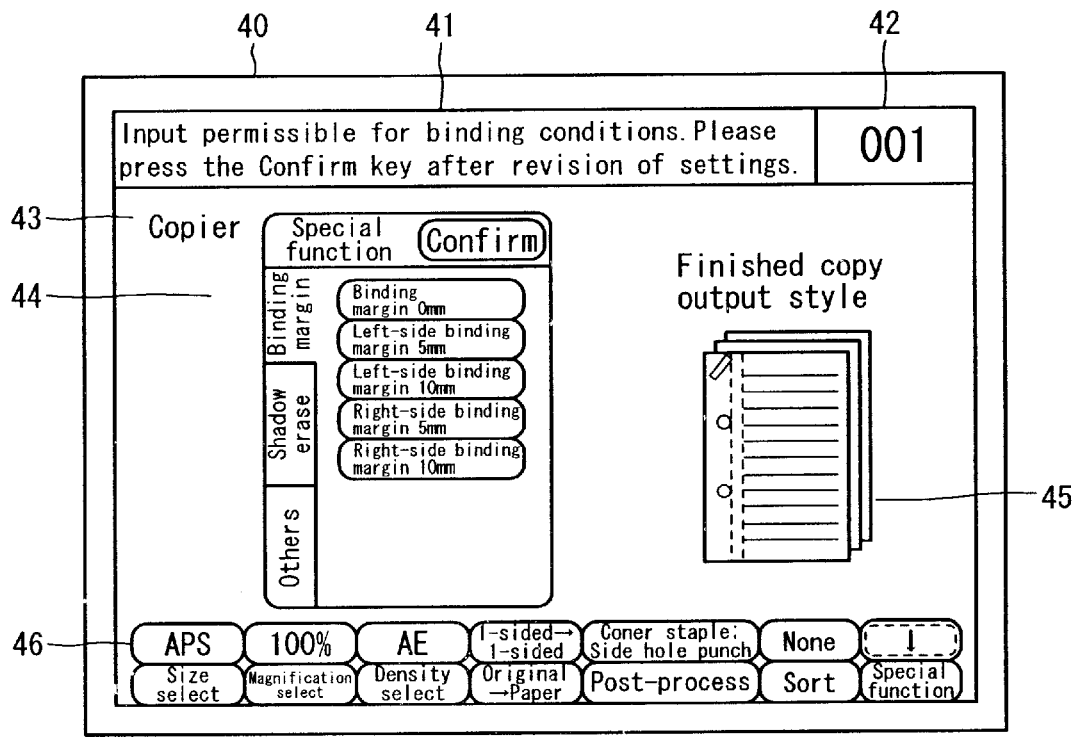
FIG. 20 is an illustrative view showing a setting frame for designating the conditions for special functions, displayed on the display screen.

Subsequently, when the special function setting key from the condition setting keys is selected, the setting frame for selecting special function conditions is displayed(see FIGS. 18 and 19). From these special functions, '5 mm left-side binding margin' is selected as the binding margin function, finished copy output style display area 45 changes its picture to that of one bound on the left side(see FIGS. 19 and 20). As shown in FIG. 20, in finished copy output style display area 45, the area of the designated setting(left-side binding area) is enclosed by broken lines. Similarly, the setting keys for special functions are also displayed with enclosing broken lines as the pictoral representations in the icon. In the above way, it is possible to make distinguishable the pictorial representations of the conditions (enclosed with the broken lines) in the input-active setting frame from the pictorial representations of the conditions (enclosed with thick lines) in the input-inactive setting frame. Or more specially, the display portions of stapling and hole punching and the binding margin display portion can be made distinguishable from each other.

Thus, the conditions input through the setting keys in multiple setting frames are displayed in correspondence with the associated setting keys while the input-active state and the input-inactive state are differentiated from each other, so it is possible to easily recognize the currently set conditions. Further, since the setup statuses of functions are well related to the integrally represented icon in an easy-to-recognize manner, it is possible to easily revise the settings.

<Setting Frame: Relationship between a Set Function and its Pictorial Representation>

Next, the function of making visually distinguishable the relationship between one setup function and its pictorial representation in the integrally displayed icon when multiple setup conditions exist in one input-active setting frame will be described taking as an example the staple function and hole punching function being set up for post-processing.

First, settings of the post-processing status are revised in the same procedures as above. That is, as the post-process setting key is selected from the condition setting keys in the top frame shown in FIG. 4, the view on the display changes to the setting frame for selecting the post-process conditions shown in FIG. 5. As a post-process setting, the staple function 'corner staple' is selected, the display in finished copy output style display area 45 changes to a picture of copies stapled at a corner, meeting the set condition (see FIGS. 5 and 21).

Figure 21:
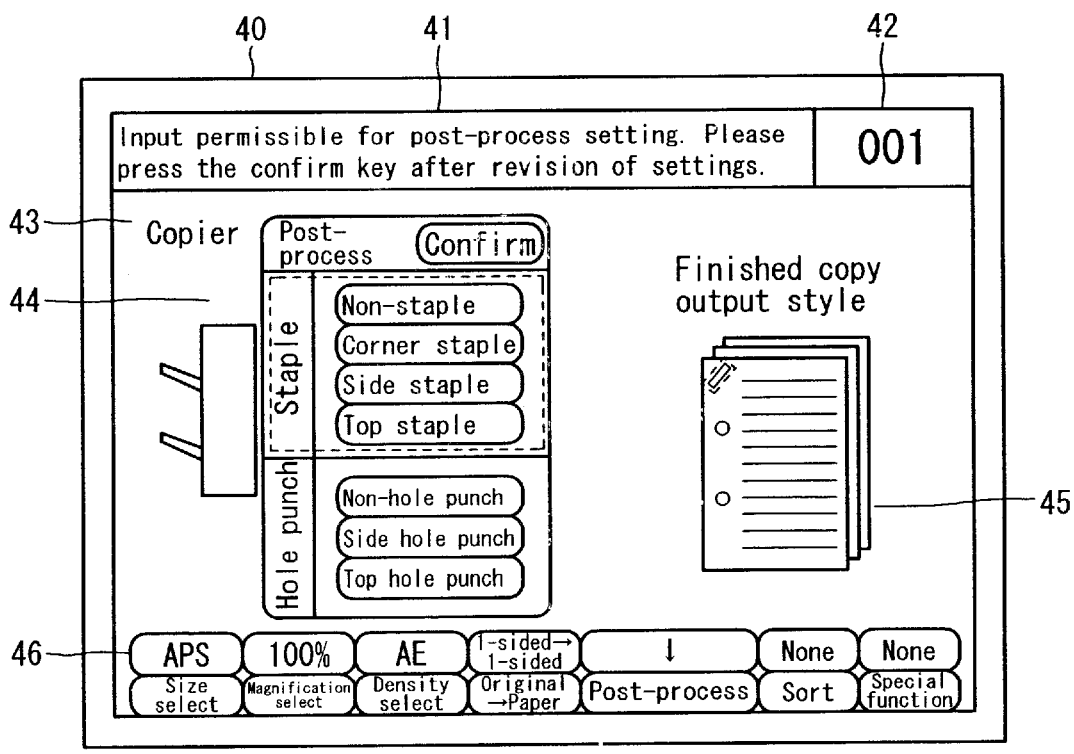
FIG. 21 is an illustrative view showing a setting frame for designating the conditions for special functions, displayed on the display screen.

As shown in FIG. 21, in finished copy output style display area 45, the portion of the designated setting (stapled areas) is enclosed by broken lines. Similarly, the staple selection menu of the post-processing setting is also displayed enclosed with a broken line as the pictoral representations in the icon.

Figure 22:
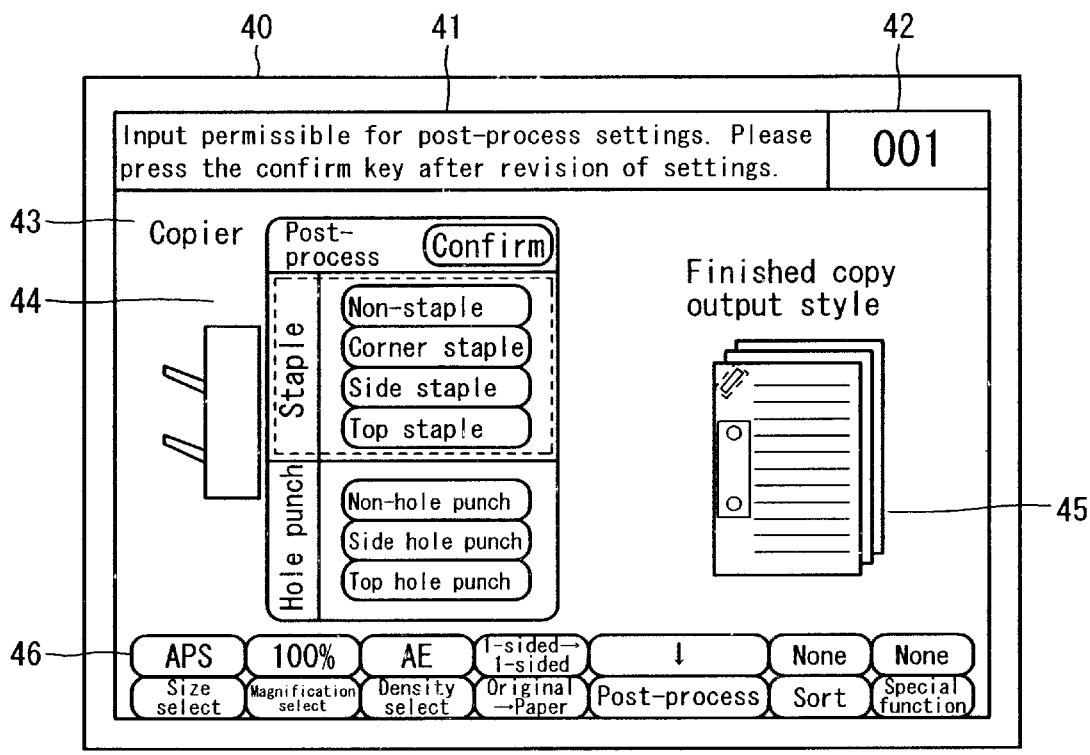
FIG. 22 is an illustrative view showing a setting frame for designating the conditions for special functions, displayed on the display screen.

Then, the hole punch function 'side hole punch' is selected, the display in finished copy output style display area 45 changes to a picture of copies hole punched along the side edge, meeting the set condition (see FIGS. 21 and 22).

As shown in FIG. 22, in finished copy output style display area 45, the condition area (hole punch portion) is displayed enclosed by a solid line, at the same time, the hole punch selection menu of the post-processing setting is also displayed enclosed with a broken line as the pictorial representations in the icon.

In this way, when multiple setup conditions exist in one input-active setting frame, the relationship between one set function and its pictorial representation in the integrally represented icon is displayed visually distinguishable, to thereby differentiate one set function from another. As a result, the relationship of function settings with the integrally represented icon can be easily understood, making it possible to easily revise the settings.

<Setting Frame: Advisory Display>

Next, description will be made as to an advisory display to be given when the conditions set through the input-active setting frame are expected to yield an unpreferred result.

When, for example, the copy image becomes too large to fit to the selected paper, by setting up the special function 'binding margin', it is necessary to make an image reduction setup by using the size-adjustment function so as to fit the image to the paper. So that, if the result of settings affects the finished copy output (e.g., the image size is too large and will not fit within the paper), a warning of an unpreferred output is provided by the integral pictorial representation while the function settings which will produce the normal copy result (e.g., the image size fitting to the paper) are informed through the pictorial representation and setting keys.

First, settings of the post-processing status are entered in the same procedures as above. That is, as the post-process setting key is selected from the condition setting keys in the top frame shown in FIG. 4, the view on the display changes to the setting frame for selecting the post-process conditions shown in FIG. 23. In this case, the 'downward arrow' is displayed in the status indicator in the upper row of setting key display area 46 so as to show that the condition selection is in progress.

Figure 23:
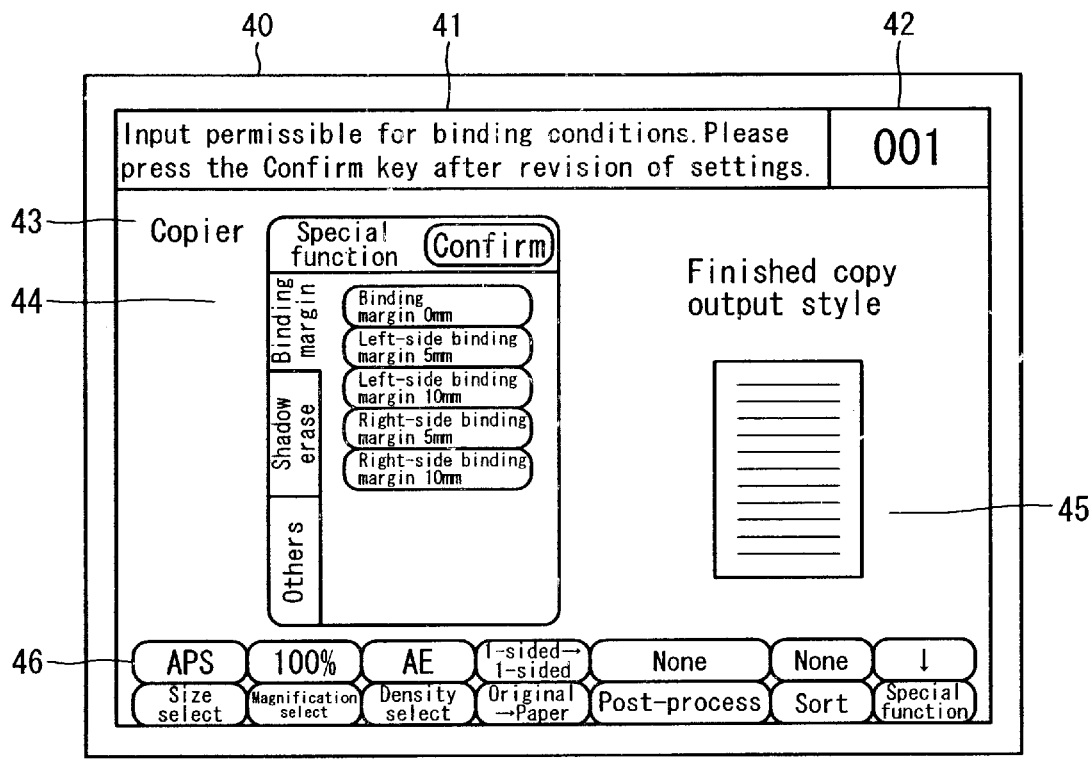
FIG. 23 is an illustrative view showing a setting frame for designating the conditions for special functions, displayed on the display screen.
Figure 24:
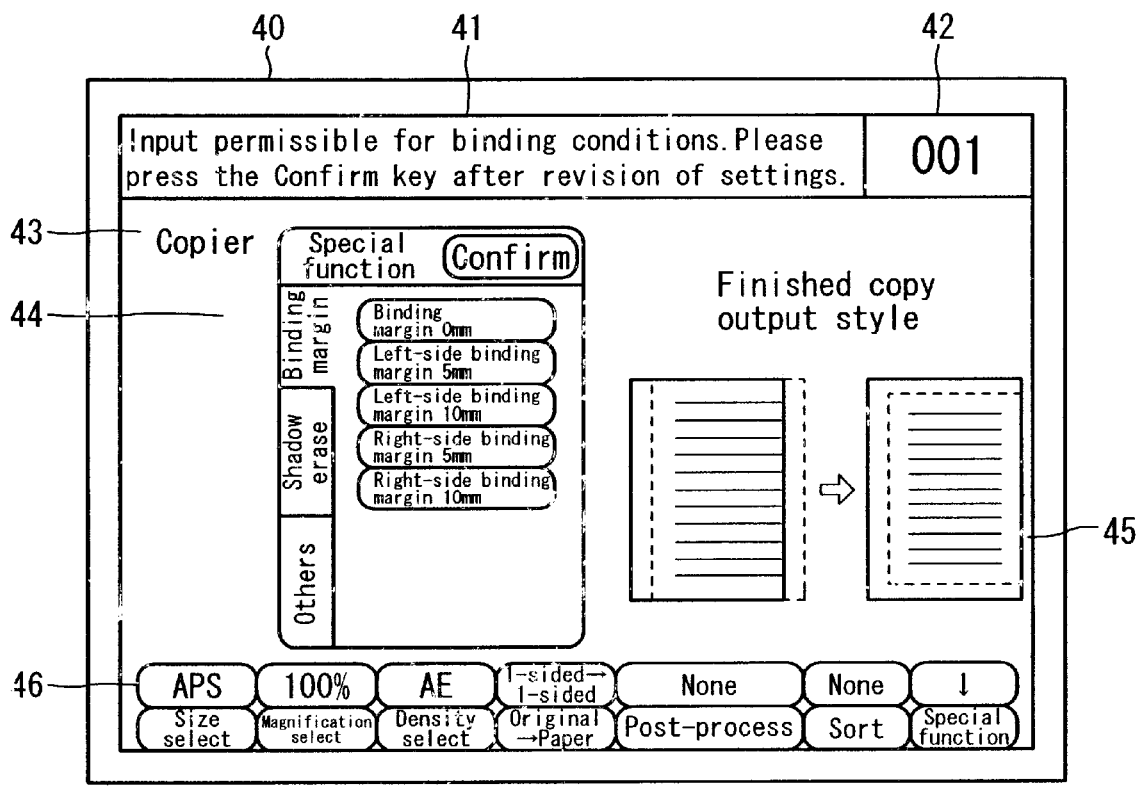
FIG. 24 is an illustrative view showing a setting frame for designating the conditions for special functions, displayed on the display screen.

When the '5 mm left-side binding margin' is selected for the binding margin function, the display in finished copy output style display area 45 changes to the picture with the '5 mm left-side binding margin' (see FIGS. 23 and 24).

When the image will not fit within the paper size by setting up a '5 mm left-side binding margin' in finished copy output style display area 45 as shown in FIG. 24, a pictorial representation with the image, reduced in size, being fit within the paper is displayed at the side of the picture of the unmodified setting in finished copy output style display area 45. In this case, the magnification setting key is made distinctive from other setting keys by enclosing the magnification setting key with a broken line.

In this way, by providing a warning of an unpreferred output using a pictorial representation, it is possible for the user to recognize the possibility of the image being too large to fit within the paper due to setting of a binding margin and to easily know that the problem will be solved by using the reduction setting of the magnification function.

Thus, this configuration makes it possible for the user to visually know the function to be set up next, from the integral display with a preview of the current finished output state. Further, the display is provided in correspondence with the associated setting key, so that the user can readily know the relationship between the icon and function setting condition, which leads to prevention of setting errors as well as to ease of operation in condition setting.

As has been described heretofore, in the input display system according to the present invention, use of the icon or pictorial representations makes it possible to integrally display a multiple number of conditions input through the condition setting keys belonging to different setting frames. Further, a condition which is pictorially represented corresponding to a setting key arranged in one input-active setting frame can be displayed so as to be visually distinguishable from other conditions which are pictorially represented corresponding to setting keys in input-inactive frames.

Since this configuration makes it possible for the user to easily check and recognize the currently set conditions and output result, output failures such as miscopies due to setup errors can be eliminated.

In the input display system according to the present invention, provision of the back key makes it possible to cancel the condition set immediately before via a setting key and activate the setting frame corresponding to that condition.

Therefore, it is possible to reduce the number of key operations when the condition set immediately before is revised because of input errors and the like, thus making it possible to provide ease of operation in setting conditions.

In the input display system according to the present invention, it is possible to activate one of a multiple number of setting frames, by touching its related area in the integrally displayed icon as a trigger input.

Since the user is able to make active one of the setting frames for the function setting conditions without touching multiple setting keys, it is possible to easily revise the setting conditions in the icon or pictorial representations, leading to a further ease of condition setting.

In the input display system according to the present invention, the relationship between the setting key in an input-active setting frame and the pictorial representation corresponding to the key is displayed so as to be visually distinctive from that between the setting key in an input-inactive setting frame and the pictorial representation corresponding to the key.

Thus, since the set conditions of a function are well related to the integrally represented icon, it is possible to provide a further ease of operation in setting up conditions.

In the input display system according to the present invention, it is possible to make visually distinguishable the relationship between each setup function and its pictorial representation in the integrally displayed icon when multiple setup conditions exist in one input-active setting frame.

Thus, since the set conditions of a function are well related to the integrally represented icon, it is possible to provide a further ease of operation in setting up conditions.

In the input display system according to the present invention, when the conditions set through the input-active setting frame are expected to yield an unpreferred result, this fact is warned of by integral pictorial representations and at the same time the conditions for producing a normal output result can be informed by pictorial representations and conditions keys.

Therefore, this configuration makes it possible for the user to visually know the function to be set up next, from the integral display with a preview of the current finished output state. Further, since the conditions for producing a normal output result is displayed by the pictorial representations and condition keys, this makes it possible for the user to readily know the relationship between the icon and function setting conditions, which leads to prevention of setting errors as well as to a further ease of operation in condition setting.

What is claimed is:

1. An input display system comprising:
    a plurality of setting frames, each having setting keys for setting variable operational conditions of an apparatus;
    a switching means for sequentially selecting one of the plural setting frames as an input-active setting frame to permit input thereto and the display thereof;
    an icon for representing set conditions in accordance with the conditions set up through the setting keys; and
    a display means for displaying one of the plurality of setting frames with the icon,
    characterized in that said icon pictorially and integrally represents the status of said variable operational conditions established via said keys of the sequentially selected input-active frames in a manner that is visually distinguishable from other variable operational conditions of the apparatus.

2. The input display system according to claim 1, further comprising a back key for canceling the condition set up immediately before by a setting key and activating the setting frame corresponding to the condition.

3. The input display system according to claim 2, wherein pictorial representations displayed in the integrally displayed icon are used as input triggers so that one of the plural setting frames will be made active.

4. The input display system according to claim 3, wherein, of the conditions integrally and pictorially represented in the icon, the relationship between one setting key arranged in an input-active setting frame and the pictorial representation corresponding to the setting key is made visually distinguishable from that between one setting key arranged in an input-inactive setting frame and the pictorial representation corresponding to the setting key.

5. The input display system according to claim 4, wherein when a plurality of conditions may be set up through the setting keys in one input-active setting frame, the relationship between each condition so set up and the pictorial representation corresponding thereto in the integrally displayed icon is displayed so as to be visually distinctive from other relationships.

6. The input display system according to claim 2, wherein, of the conditions integrally and pictorially represented in the icon, the relationship between one setting key arranged in an input-active setting frame and the pictorial representation corresponding to the setting key is made visually distinguishable from that between one setting key arranged in an input-inactive setting frame and the pictorial representation corresponding to the setting key.

7. The input display system according to claim 6, wherein when a plurality of conditions may be set up through the setting keys in one input-active setting frame, the relationship between each condition so set up and the pictorial representation corresponding thereto in the integrally displayed icon is displayed so as to be visually distinctive from other relationships.

8. The input display system according to claim 1, wherein pictorial representations displayed in the integrally displayed icon are used as input triggers so that one of the plural setting frames will be made active.

9. The input display system according to claim 8, wherein, of the conditions integrally and pictorially represented in the icon, the relationship between one setting key arranged in an input-active setting frame and the pictorial representation corresponding to the setting key is made visually distinguishable from that between one setting key arranged in an input-inactive setting frame and the pictorial representation corresponding to the setting key.

10. The input display system according to claim 9, wherein when a plurality of conditions may be set up through the setting keys in one input active setting frame, the relationship between each condition so set up and the pictorial representation corresponding thereto in the integrally displayed icon is displayed so as to be visually distinctive from other relationships.

11. The input display system according to claim 1, wherein, of the conditions integrally and pictorially represented in the icon, the relationship between one setting key arranged in an input-active setting frame and the pictorial representation corresponding to the setting key is made visually distinguishable from that between one setting key arranged in an input-inactive setting frame and the pictorial representation corresponding to the setting key.

12. The input display system according to claim 11, wherein when a plurality of conditions may be set up through the setting keys in one input-active setting frame, the relationship between each condition so set up and the pictorial representation corresponding thereto in the integrally displayed icon is displayed so as to be visually distinctive from other relationships.

13. The input display system according to any one of claims 1 through 12, wherein if any condition set up in an input-active setting frame yields an unpreferred result, this fact is warned of by the integral pictorial representation and at the same time the conditions for producing a normal output result are informed in the pictorial representation and by visually distinguishing the setting keys for setting said normal result.

* * * * *